(12) United States Patent
Mitsui et al.

(10) Patent No.: US 10,498,283 B2
(45) Date of Patent: Dec. 3, 2019

(54) MOTOR DRIVE DEVICE

(71) Applicant: HITACHI AUTOMOTIVE SYSTEMS, LTD., Hitachinaka-shi, Ibaraki (JP)

(72) Inventors: Toshisada Mitsui, Hitachinaka (JP); Hideki Miyazaki, Hitachinaka (JP); Seigo Yukutake, Hitachinaka (JP); Katsuhiro Hoshino, Hitachinaka (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 15/548,875

(22) PCT Filed: Jan. 15, 2016

(86) PCT No.: PCT/JP2016/051060
§ 371 (c)(1),
(2) Date: Aug. 4, 2017

(87) PCT Pub. No.: WO2016/125557
PCT Pub. Date: Aug. 11, 2016

(65) Prior Publication Data
US 2018/0034406 A1 Feb. 1, 2018

(30) Foreign Application Priority Data
Feb. 6, 2015 (JP) .................... 2015-022256

(51) Int. Cl.
*H02P 27/12* (2006.01)
*H02P 6/08* (2016.01)
*H02P 21/22* (2016.01)

(52) U.S. Cl.
CPC .............. *H02P 27/12* (2013.01); *H02P 6/085* (2013.01); *H02P 21/22* (2016.02); *H02P 2209/03* (2013.01)

(58) Field of Classification Search
CPC ....................................................... H02P 27/12
(Continued)

(56) References Cited

U.S. PATENT DOCUMENTS

2005/0001581 A1    1/2005   Sakamoto et al.
2009/0302792 A1*  12/2009   Osada .................. H02P 29/032
                                                 318/400.21

(Continued)

FOREIGN PATENT DOCUMENTS

CN    103731079 A  *  4/2014
CN    104242775 A  * 12/2014
(Continued)

OTHER PUBLICATIONS

Kubo Hajime et al. "Current ripple analysis of PWM methods for open-end winding Induction motor", 2014 IEEE Energy Conversion Congress and Exposition (EGCE), IEEE, Sep. 14, 2014 (Sep. 14, 2014), pp. 3858-3864, XP032680776 (Year: 2014).*
(Continued)

*Primary Examiner* — Jorge L Carrasquillo
(74) *Attorney, Agent, or Firm* — Foley & Lardner LLP

(57) ABSTRACT

Provided is a motor drive device capable of adjusting a 0-axis current to a desired value.
A motor drive device (inverter device 100) for an open winding type motor 200 in which a stator winding wire includes three-phase independent winding wires 210, 220, and 230 includes a plurality of single-phase inverters 160, 170, and 180 provided for each of the winding wires 210 to 230 to individually apply a voltage to a corresponding winding wire, and a controller 150 that controls each of the single-phase inverters 160 to 180. The controller 150 adjusts a 0-axis current to a predetermined value by alternately and repeatedly generating a first period in which a sum of voltages applied to the respective independent winding
(Continued)

wires 210 to 230 is set to a value other than zero to offset the 0-axis current and a second period in which the sum of the voltages applied to the respective winding wires 210 to 230 is set to zero.

6 Claims, 28 Drawing Sheets

(58) Field of Classification Search
USPC .............................. 318/568.22, 572, 400.02
See application file for complete search history.

(56) References Cited

U.S. PATENT DOCUMENTS

| | | | | |
|---|---|---|---|---|
| 2014/0062353 A1* | 3/2014 | Oyobe | ................. | H02P 27/085 318/400.02 |
| 2014/0285125 A1* | 9/2014 | Kato | ........................ | H02P 6/06 318/400.02 |
| 2014/0292239 A1* | 10/2014 | Kato | .................. | H02P 21/0017 318/400.02 |

FOREIGN PATENT DOCUMENTS

| | | | |
|---|---|---|---|
| JP | 2004-350455 | A | 12/2004 |
| JP | 2008-005688 | A | 1/2008 |
| JP | 2008005688 | A * | 1/2008 |
| JP | 2009-303298 | A | 12/2009 |
| WO | WO 2008/024410 | A2 | 2/2008 |
| WO | WO-2008024410 | A2 * | 2/2008 |

OTHER PUBLICATIONS

Neubert et al., "Performance Comparison of Inverter and Drive Configurations with Open-End and Star-Connected Windings," The 2014 International Power Electronics Conference, 2014, pp. 3145-3152.
International Search Report with English translation and Written Opinion issued in corresponding application No. PCT/JP2016/051060 dated Apr. 26, 2016.
Zhu et al., Comparative Study of PWM Strategies for Three-Phase Open-end Winding Induction Motor Drives, The 2014 International Power Electronics Conference, IEEE, 2014, pp. 395-402.
Kubo Hajime et al., "Current Ripple Analysis of PWM Method for Open-End Winding Induction Motor", 2014 IEEE Energy Conversion Congress and Exposition, Sep. 14, 2014, pp. 3858-3864, XP 032680776.
Kumar A et al., "Direct Torque Control of Open-End Winding Induction Motor Drive Using the Concept of Imaginary Switching Times for Marine Propulsion Systems", Industrial Electronics Society, 2005, IECON 2005, 31$^{ST}$ Annual Conference of IEEE, Piscataway, NJ, USA, Nov. 6, 2005, pp. 1504-1509, XP 010876196.
Extended European Search Report dated Sep. 25, 2018 in Application No. 16746388.4.

* cited by examiner

FIG. 3

| SW MODE | $Q_1$ | $Q_2$ | $Q_3$ | $Q_4$ | Vu |
|---|---|---|---|---|---|
| M0 | 0 | 0 | 0 | 0 | Don't Care |
| M1 | 1 | 0 | 0 | 1 | +Ed |
| M2 | 0 | 1 | 1 | 0 | −Ed |
| M3 | 1 | 0 | 1 | 0 | 0 |
| M4 | 0 | 1 | 0 | 1 | 0 |

"0" OFF, "1" ON

*FIG. 5*

| SPACE VECTOR | 0-AXIS VOLTAGE [V] |
|---|---|
| PPP0 | $+\frac{3}{\sqrt{3}} \cdot Ed$ |
| PP1, PP2, PP3 | $+\frac{2}{\sqrt{3}} \cdot Ed$ |
| P11, P12, P13,  P21, P22, P23 | $+\frac{1}{\sqrt{3}} \cdot Ed$ |
| Z0, Z1, Z2, Z3, Z4, Z5, Z6 | 0 |
| M11, M12, M13,  M21, M22, M23 | $-\frac{1}{\sqrt{3}} \cdot Ed$ |
| MM1, MM2, MM3 | $-\frac{2}{\sqrt{3}} \cdot Ed$ |
| MMM0 | $-\frac{3}{\sqrt{3}} \cdot Ed$ |

FIG. 24

| AREA | θp[°] | Zs | Zd |
|---|---|---|---|
| AREA 1 | 0 | Z1 | Z2 |
| AREA 2 | 60 | Z2 | Z3 |
| AREA 3 | 120 | Z3 | Z4 |
| AREA 4 | 180 | Z4 | Z5 |
| AREA 5 | 240 | Z5 | Z6 |
| AREA 6 | 300 | Z6 | Z1 |

MOTOR DRIVE DEVICE

TECHNICAL FIELD

The present invention relates to a motor drive device for an open winding type motor in which stator winding wires of respective phases are independent winding wires independent from each other.

BACKGROUND ART

Conventionally, there has been a known open winding type motor in which stator winding wires of respective phases are independent winding wires independent from each other. While a drive device for the open winding type motor may increase output capacity, a ripple of 0-axis current is a particular problem. To cope with such a problem, a technology referred to as zero common mode modulation (ZCMM) has been proposed in NPL 1.

When a power supply voltage is set to Ed, a voltage applied to each winding wire of the open winding type motor corresponds to three levels of {+Ed, 0, −Ed}, and voltages applied to three-phase winding wires of the motor correspond to 27 patterns. In the technology referred to as ZCMM described above, among space vectors obtained by converting the 27 patterns into αβ0-axis voltages, space vectors used for motor-applied voltages are restricted to seven space vectors at which a 0-axis motor-applied voltage corresponds to a zero value.

Here, a motor electric characteristic at a dq0-axis coordinate is expressed by Formula (1) below. A 0-axis inductance (Lz) is a function of dq-axis current. When the dq-axis current is set to a steady value, Lz is fixed, and an electrical characteristic of a 0-axis is not interfered by the dq-axis current. In Formula (1), Vd, Vq, and Vz denote motor-applied voltages of a d-axis, a q-axis, and the 0-axis, Id, Iq, and Iz denote a d-axis current, a q-axis current, and a 0-axis current, Ld, Lq, and Lz denote a d-axis inductance, a q-axis inductance, and a 0-axis inductance, r denotes a winding resistance, Ea denotes a fundamental wave induced voltage, Ez denotes a three-phase unbalanced component of an induced voltage, and P denotes a differential operator. Lz is an unbalanced component of an inductance, which is an extremely small value when compared to Ld and Lq.

[Formula 1]

$$\begin{pmatrix} V_d \\ V_q \\ V_z \end{pmatrix} = \begin{pmatrix} r+P \cdot L_d & -\omega \cdot L_q & 0 \\ \omega \cdot L_d & r+P \cdot L_q & 0 \\ 0 & 0 & r+P \cdot L_z(Id, Iq) \end{pmatrix} \begin{pmatrix} I_d \\ I_q \\ I_z \end{pmatrix} + \begin{pmatrix} 0 \\ E_a \\ E_z \end{pmatrix} \quad (1)$$

In ZCMM described in NPL 1, an induced voltage of the motor is limited to the case of only a fundamental wave. That is, when Ez is zero at all times, and a motor-applied voltage (Vz) of the 0-axis is held at zero by a scheme of ZCMM, the 0-axis current becomes zero.

CITATION LIST

Non-Patent Literature

NPL 1: Markus Neubert, Stefan Koschik, and Rik W. De Doncker, "Performance Comparison of Inverter and Drive Configurations with Open-End and Star-Connected Windings", The 2014 International Power Electronics Conference.

SUMMARY OF INVENTION

Technical Problem

However, even if a control operation by ZCMM is performed, when the three-phase unbalanced component Ez of the induced voltage of the motor is not zero, there occurs a problem that a significant 0-axis current which may not be controlled by ZCMM flows. In particular, in a permanent magnet type synchronous motor, Ez is not zero in most cases. When the motor is in a healthy state, the significant 0-axis current worsens loss, and thus needs to be adjusted to a value close to zero. In addition, a so-called two-phase operation may be performed to stop electric conduction of a one-phase winding wire and perform an operation using remaining two-phase winding wires in a state in which a light failure occurs in the motor. In such a case, the 0-axis current needs to be intentionally adjusted to a specific value to produce a smoother torque. However, this operation may not be performed in a state in which the 0-axis current flows.

Solution to Problem

The present invention is a motor drive device for an open winding type motor in which a stator winding wire includes three-phase independent winding wires, the motor drive device including: a plurality of single-phase inverters provided for each of the winding wires to individually apply a voltage to a corresponding winding wire; and a controller that controls each of the single-phase inverters provided for each of the winding wires, wherein the controller adjusts a 0-axis current to a predetermined value by alternately and repeatedly generating a first period in which a sum of voltages applied to the respective winding wires is set to a value other than zero to offset the 0-axis current and a second period in which the sum of the voltages applied to the respective winding wires is set to zero.

Advantageous Effects of Invention

According to the invention, a 0-axis current may be adjusted to a desired value in a motor drive device for an open winding type motor.

BRIEF DESCRIPTION OF DRAWINGS

FIG. 3 is a diagram illustrating a relationship between a gate signal and a winding wire voltage.

FIG. 5 is a diagram illustrating a relationship between a space vector and a 0-axis voltage.

FIG. 24 is a diagram illustrating an area of the αβ-axis, a rotation angle, and a corresponding space vector.

DESCRIPTION OF EMBODIMENTS

Figure 1:
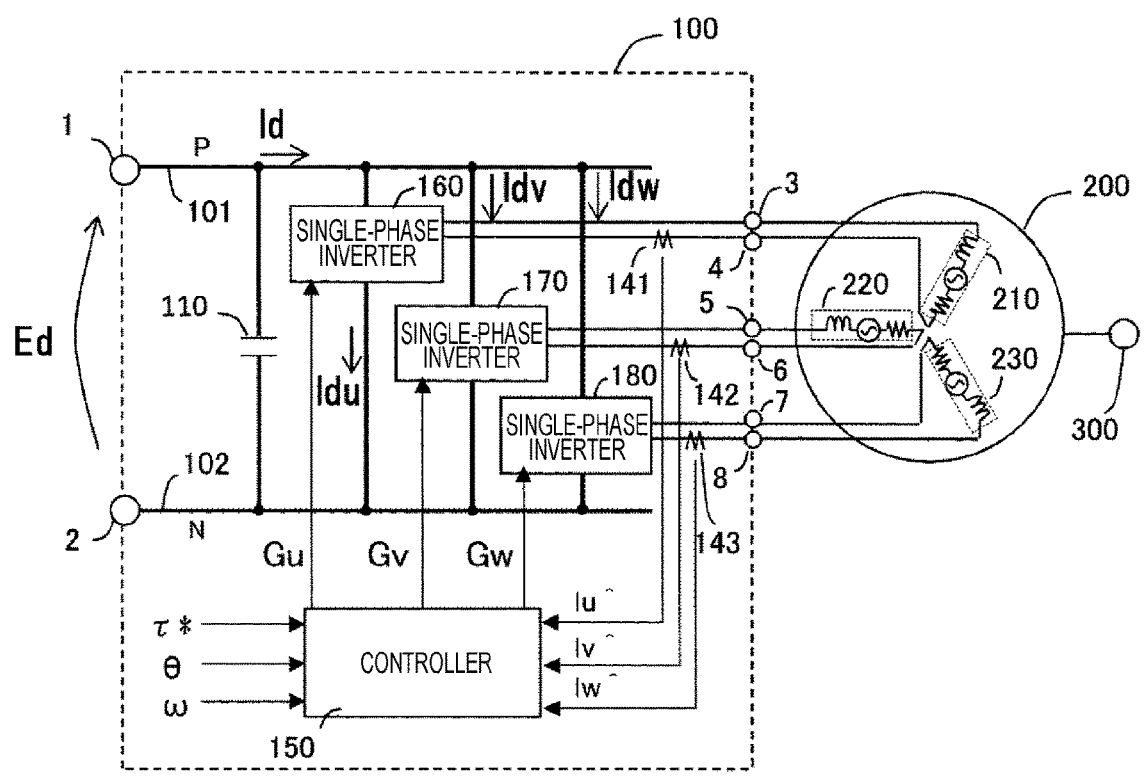
FIG. 1 is a diagram illustrating a drive device according to an embodiment of the invention.

Hereinafter, a description will be given of an embodiment for carrying out the invention with reference to drawings. FIG. 1 is a diagram illustrating a motor drive device according to an embodiment of the invention. In FIG. 1, an alternating current (AC) motor (hereinafter simply referred to as a motor) 200 is an open winding type motor in which stator winding wires of respective phases are independent winding wires independent from each other. The motor 200 is driven by an inverter device 100.

The inverter device 100 includes a P bus line 101 connected to a positive electrode side of a battery (not illustrated) (that is, a direct current (DC) power source) via a P bus line terminal 1, and an N bus line 102 connected to a negative electrode side of the battery via an N bus line terminal 2. A DC voltage Ed is supplied between the P bus line 101 and the N bus line 102 by the battery. In addition, DC power is mutually exchanged between the inverter device 100 and the battery. A relay (not illustrated) for switching between ON and OFF states according to an operation state of a system may be provided between the inverter device 100 and the battery.

The inverter device 100 has AC terminals 3, 4, 5, 6, 7, and 8 for connection with the motor 200. DC power is mutually exchanged between the inverter device 100 and the motor 200 via the AC terminals 3 to 8. The motor 200 includes a machine output shaft 300. When a load (not illustrated) is connected to the machine output shaft 300, a machine output is mutually exchanged between the motor 200 and the load.

A smoothing capacitor 110 for smoothing a bus line current Id is connected between the P bus line 101 and the N bus line 102 of the inverter device 100. Three single-phase inverters 160, 170, and 180 are connected between the P bus line 101 and the N bus line 102 at a downstream side of the smoothing capacitor 110. In the P bus line 101 and the N bus line 102, a portion from the smoothing capacitor 110 to the single-phase inverter 160 is commonly used for the single-phase inverters 160, 170 and 180. Inverter currents Idu, Idv and Idw are each exchanged between the respective single-phase inverters 160 to 180 and the P bus line 101 and the N bus line 102. As illustrated in FIG. 1, polarities of the inverter currents Idu, Idv, and Idw are determined such that a direction from the P bus line 101 to the N bus line 102 is positive and an opposite direction thereof is negative.

Three-phase independent winding wires 210, 220, and 230 are provided in a stator of the motor 200. A U-phase independent winding wire 210 is connected to the single-phase inverter 160 via the AC terminals 3 and 4. A V-phase independent winding wire 220 is connected to the single-phase inverter 170 via the AC terminals 5 and 6. A W-phase independent winding wire 230 is connected to the single-phase inverter 180 via the AC terminals 7 and 8. The independent winding wires 210, 220 and 230 are winding wires which are not electrically connected to each other and in which a current does not flow in and out from each other. That is, a current flowing through each independent winding wire in the motor 200 flows out of the motor 200 without passing through another independent winding wire.

A current sensor 141 is provided between the single-phase inverter 160 and the AC terminal 4. A current sensor 142 is provided between the single-phase inverter 170 and the AC terminal 6. A current sensor 143 is provided between the single-phase inverter 180 and the AC terminal 8. The current sensors 141, 142, and 143 measure winding currents Iu, Iv, and Iw flowing through the respective independent winding wires 210, 220, and 230 of the motor 200, respectively, and output measured current values Iu^, Iv^, and Iw^ to a controller 150.

The controller 150 generates gate signals Gu, Gv, and Gw based on an operation command τ* of the motor 200 input from a higher-order control device (not illustrated), the measured current values Iu^, Iv^, and Iw^ from the current sensors 141, 142, and 143, and a motor phase θ and revolutions per minute (rpm) ω of the motor input from a circuit (not illustrated). The gate signals Gu, Gv, and Gw are output to the corresponding single-phase inverters 160, 170, and 180, respectively. In the controller 150, a process for controlling a 0-axis current as described below is performed when the gate signals Gu, Gv, and Gw according to the operation command are generated.

(Operation of Single-Phase Inverter)

Figure 2:
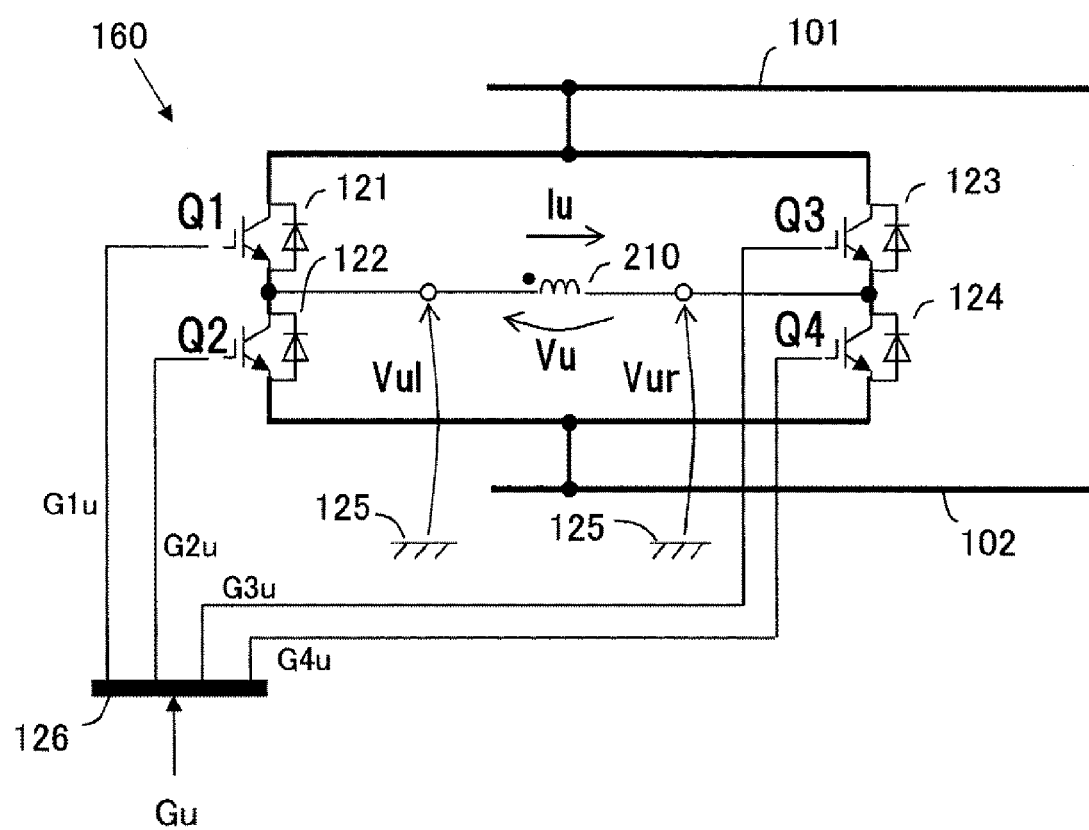
FIG. 2 is a diagram illustrating an electrical configuration of a single-phase inverter and an independent winding wire.

FIG. 2 is a diagram illustrating an electrical configuration of the single-phase inverter 160 and the independent winding wire 210. A relationship between the single-phase inverter 170 and the independent winding wire 220 and a relationship between the single-phase inverter 180 and the independent winding wire 230 have the same electrical configuration as that in the case of the single-phase inverter 160 and the independent winding wire 210. Therefore, hereinafter, operations of the single-phase inverters 160, 170, and 180 will be described using the electrical configuration of the single-phase inverter 160 and the independent winding wire 210 illustrated in FIG. 2 as a representative example.

The single-phase inverter 160 includes switching elements Q1, Q2, Q3, and Q4 and feedback diodes 121, 122, 123, and 124 connected to the switching elements Q1, Q2, Q3, and Q4, respectively. A bridge circuit illustrated in FIG. 2 is configured using these elements and diodes. This bridge circuit is connected between both terminals of the independent winding wire 210, and a voltage Vu is applied to the independent winding wire 210 according to a state of each of the switching elements Q1, Q2, Q3, and Q4. A polarity of the voltage Vu is illustrated in the figure.

The gate signal Gu output from the controller 150 is decomposed into gate signals G1u, G2u, G3u, and G4u for the respective switching elements Q1, Q2, Q3, and Q4 by a signal separator 126 in the single-phase inverter 160. States of the respective switching elements Q1, Q2, Q3, and Q4 are determined by the gate signals G1u, G2u, G3u, and G4u.

A list illustrated in FIG. 3 shows a relationship between the states of the switching elements Q1, Q2, Q3, and Q4 and the voltage Vu applied to the independent winding wire 210 in the bridge circuit illustrated in FIG. 2. In FIG. 3, combinations of possible states of the respective switching elements Q1, Q2, Q3, and Q4 are expressed as switch modes (SW modes) M0, M1, M2, M3, and M4. In addition, referring to ON/OFF states of the respective switching elements Q1, Q2, Q3, and Q4, an OFF state is represented by "0", and an ON state is represented by "1". A period during which the switch mode M1 or M2 is selected is a so-called non-reflux period. On the other hand, a period during which the switch mode M3 or M4 is selected is a reflux period. Either switch mode M3 or M4 is selected.

A virtual ground potential 125 illustrated in FIG. 2 is a reference potential virtually determined so that a potential of the P bus line 101 is +Ed/2 and a potential of the N bus line 102 is −Ed/2. A potential on a left side of the independent winding wire 210 in the figure, that is, a potential between the switching element Q1 and the switching element Q2 is set to a voltage Vu1 based on this virtual ground potential 125. Similarly, a potential on a right side of the independent winding wire 210 in the figure, that is, a potential between the switching element Q3 and the switching element Q4 is set to a voltage Vur. A relationship of Formula (2) below is satisfied between these voltages and the voltage Vu applied to the independent winding wire 210.

$$Vu = Vu1 - Vur \quad (2)$$

In PWM control, when the power supply voltage is set to Ed, the switch mode M1 is used to set the voltage Vu of the independent winding wire 210 to +Ed as illustrated in FIG. 3. In addition, the switch mode M3 or the switch mode M4 is used to set the voltage Vu to zero. Further, the switch mode M2 is used to set the voltage Vu to −Ed.

Figure 4:
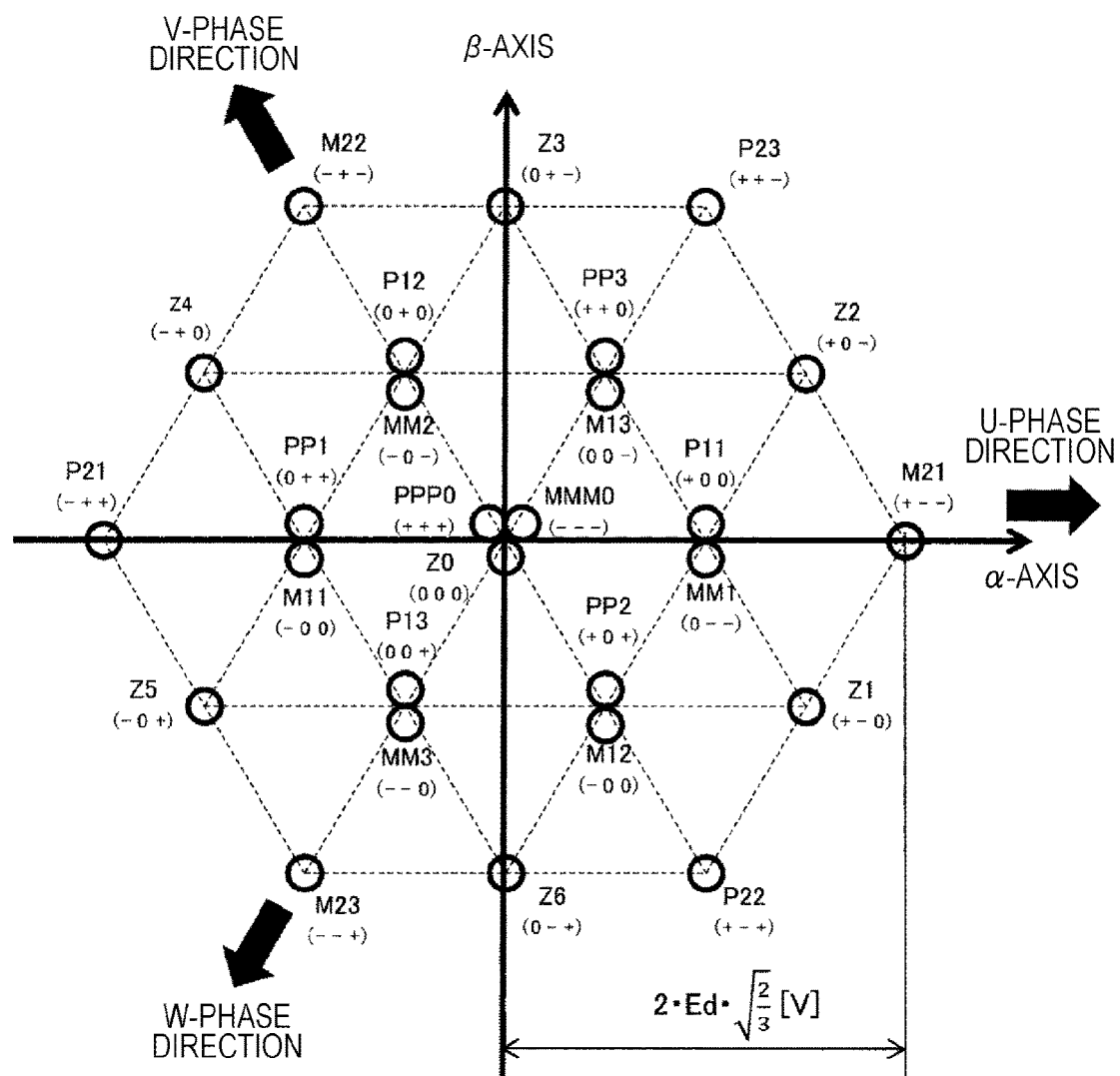
FIG. 4 is a diagram illustrating a distribution of space vectors on an αβ-axis.

In this way, voltages applied to the respective independent winding wires 210, 220, and 230 of the open winding type motor 200 correspond to three levels of {+Ed, 0, −Ed}, and voltages applied to three-phase winding wires of the motor 200 correspond to 27 patterns. FIG. 4 illustrates these 27 patterns converted into αβ0-axis voltages using Formula (3) below and represents space vectors using circles on a αβ plane. Here, a voltage applied to a U-phase winding wire is set to Vu. Similarly, voltages applied to a V-phase winding wire and a W-phase winding wire are set to Vv and Vw.

[Formula 2]

$$\begin{pmatrix} V_\alpha \\ V_\beta \\ V_z \end{pmatrix} = \sqrt{\frac{2}{3}} \cdot \begin{pmatrix} 1 & -\frac{1}{2} & -\frac{1}{2} \\ 0 & \frac{\sqrt{3}}{2} & -\frac{\sqrt{3}}{2} \\ \frac{1}{\sqrt{2}} & \frac{1}{\sqrt{2}} & \frac{1}{\sqrt{2}} \end{pmatrix} \cdot \begin{pmatrix} V_u \\ V_v \\ V_w \end{pmatrix} \quad (3)$$

In FIG. 4, when a plurality of circles representing space vectors is in contact with each other, coordinates of the respective space vectors on the αβ plane are the same. For example, αβ coordinates of space vectors P12 and MM2 are equal to each other. In addition, αβ coordinates of space vectors Z0, PPP0, and MMM0 are equal to one another, and circles thereof are positioned at an origin of the αβ coordinates.

An initial mark of a symbol representing each space vector, for example, a mark PPP of alphabets PPP0 represents a magnitude of a voltage in a 0-axis direction of the space vector. A 0-axis voltage Vz of each space vector is shown in FIG. 5. In FIGS. 4 and 5, a mark P indicates that a 0-axis voltage is a positive voltage, a 0-axis voltage of a space vector having PPP corresponds to $(+3/\sqrt{3}) \cdot Ed$, a 0-axis voltage of a space vector having PP (for example, PP1) corresponds to $(+2/\sqrt{3}) \cdot Ed$, and a 0-axis voltage of a space vector having P (for example, P11) corresponds to $(+1/\sqrt{3}) \cdot Ed$. Meanwhile, a mark M indicates that a 0-axis voltage is a negative voltage, a 0-axis voltage of a space vector having MMM corresponds to $(-3/\sqrt{3}) \cdot Ed$, a 0-axis voltage of a space vector having MM (for example, MM1) corresponds to $(-2/\sqrt{3}) \cdot Ed$, and a 0-axis voltage of a space vector having M (for example, M11) corresponds to $(-1/\sqrt{3}) * Ed$. In addition, a mark Z indicates that a 0-axis voltage is zero, and all 0-axis voltages (Vz) of seven space vectors Z0 to Z6 correspond to zero.

Here, a 0-axis current (Iz) is defined as an amount directly proportional to a total sum value of AC currents. In the invention, since description needs to be standardized, the 0-axis current (Iz) is defined by Formula (4) below. A proportional constant $1/\sqrt{3}$ in Formula (4) is introduced to standardize the description, and another positive constant such as "1" may be used. A control method described in NPL 1 proposes that a space vector used for a motor-applied voltage be limited to these seven vectors, and this scheme is referred to as Zero Common Mode Modulation (ZCMM).

[Formula 3]

$$I_Z = \frac{1}{\sqrt{3}} \cdot (Iu + Iv + Iw) \quad (4)$$

Figure 6:
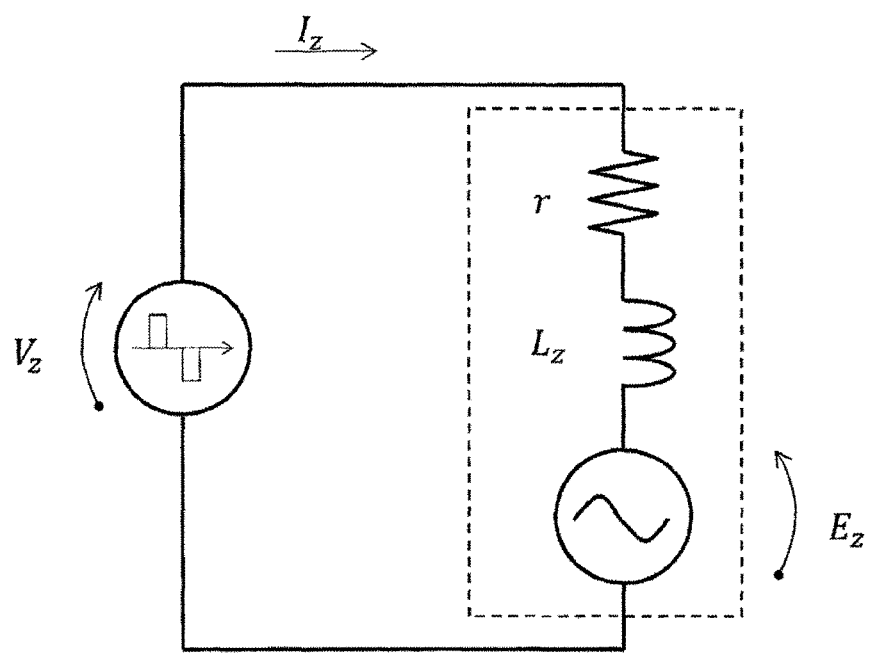
FIG. 6 is a diagram illustrating a circuit image of an electrical characteristic of a 0-axis.
Figure 7:
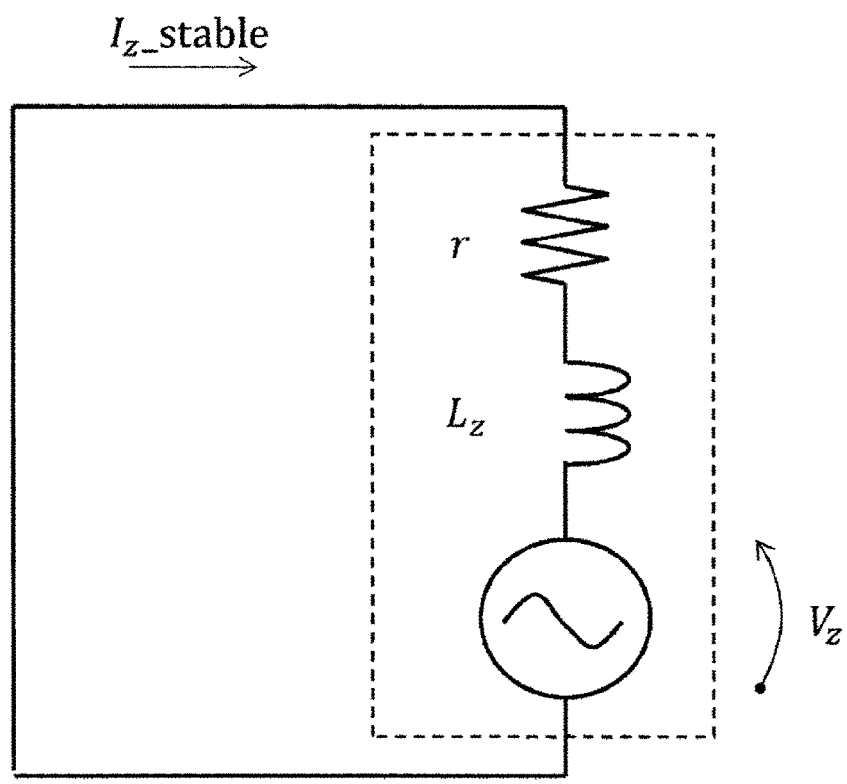
FIG. 7 is a diagram illustrating an electrical characteristic of a 0-axis current standing wave.
Figure 8:
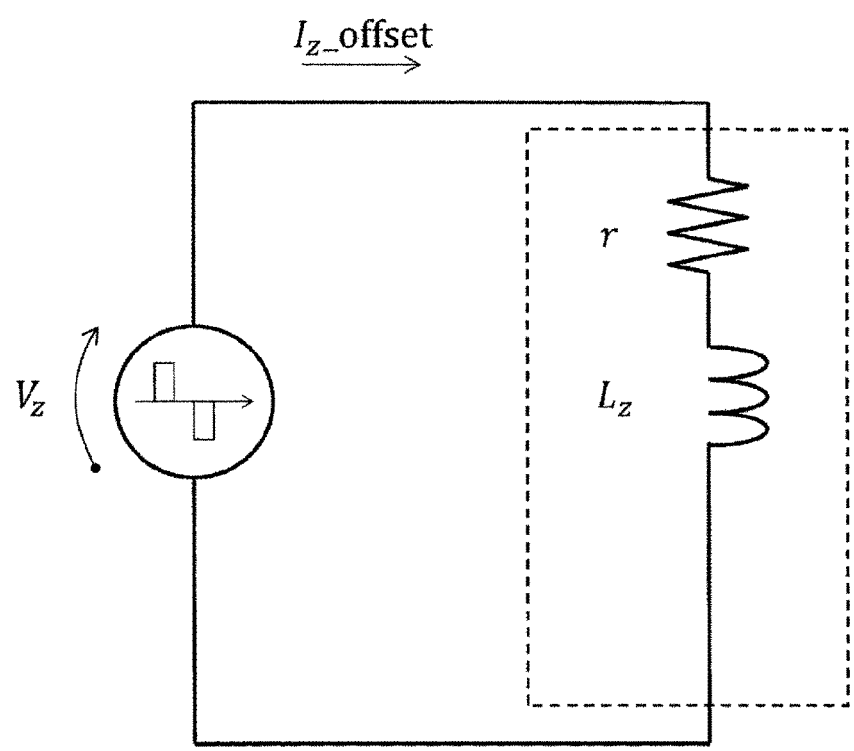
FIG. 8 is a diagram illustrating an electrical characteristic of a 0-axis current offset amount.

FIG. 6 illustrates a circuit image of an electric characteristic of a zero axis. The circuit illustrated in FIG. 6 may be expressed by superimposing a circuit illustrated in FIG. 7 on a circuit illustrated in FIG. 8. When a current of the circuit of FIG. 6 is set to Iz, a current of the circuit of FIG. 7 is set to Iz_stable, and a current of the circuit of FIG. 8 is set to Iz_offset, Formula (5) below is satisfied.

[Formula 4]

$$I_z = I_{z\_stable} + I_{z\_offset} \quad (5)$$

Iz_stable is a waveform unique to the motor, and is determined by Id, Iq and a motor phase. Iz_stable indicates a 0-axis current standing wave. Meanwhile, Iz_offset indicates a 0-axis current offset amount that can be managed by control. When a 0-axis voltage Vz in FIG. 7 is appropriately determined, a 0-axis current Iz may be adjusted to a value close to zero by setting Iz_offset to be approximately opposite to a polarity of Iz_stable, that is, by setting Iz_offset to Iz_offset* shown in Formula (6) below. In addition, when a target value Iz* of the 0-axis current Iz is clearly indicated, and it is desired to adjust the 0-axis current Iz to an arbitrary value, the 0-axis current Iz may be adjusted to the arbitrary value by setting Iz_offset to Iz_offset* shown in Formula (7) below using a similar scheme.

[Formula 5]

$$I_z\_\text{offset}^* \approx I_z\_\text{stable} \quad (6)$$

$$I_z\_\text{offset}^* \approx I_z^* - I_z\_\text{stable} \quad (7)$$

Next, a scheme of determining the 0-axis voltage Vz will be described. When it is desired to assign a positive voltage to the 0-axis voltage Vz, space vectors described below among the space vectors shown in FIG. 5 are used for a predetermined time. (Space vectors assigning a positive voltage to the 0-axis voltage Vz)

P11, P12, P13, P21, P22, P23
PP1, PP2, PP3
PPP0

In addition, when it is desired to assign a negative voltage to Vz, space vectors described below are used for a predetermined time.

(Space Vectors Assigning a Negative Voltage to the 0-Axis Voltage Vz)

M11, M12, M13, M21, M22, M23
MM1, MM2, MM3
MMM0

(Description of Predetermined Time when Non-ZCMM Space Vector is Used)

Next, a description will be given of a predetermined time when a non-ZCCM space vector is used. Formula (8) below is an expression expressing a time response of Iz_offset when a voltage step is assigned at time t0. In this case, regardless of whether a positive voltage or a negative voltage is applied to Vz, the form is a voltage pulse. Therefore, it is possible to determine a used space vector with which and a time in seconds after which Iz_offset equals a desired value using Formula (8). A time from time t0 to time t1 at which Iz_offset equals the desired value corresponds to a pulse width, that is, a predetermined time of the space vector for non-ZCMM. After Iz_offset equals the desired value Iz_offset*, Iz_offset spontaneously attenuates according to Formula (9) below when the ZCMM space vector, that is, the 0-axis voltage Vz is switched to a space vector of zero.

[Formula 6]

$$I_z\_\text{offset}(t) = \frac{V_z}{r} + \left\{ I_z\_\text{offset}(t_0) - \frac{V_z}{r} \right\} \cdot \exp^{-\frac{t-t_0}{\tau_z}} \quad (8)$$

where $\tau_z = r \cdot L_z (t \geq t0)$ $$I_z\_\text{offset}(t) = I_z\_\text{offset}(t_1) \cdot \exp^{-\frac{t-t_1}{\tau_z}} \quad (9)$$

where $\tau_z = r \cdot L_z \quad (t \geq t1)$

Figure 9:
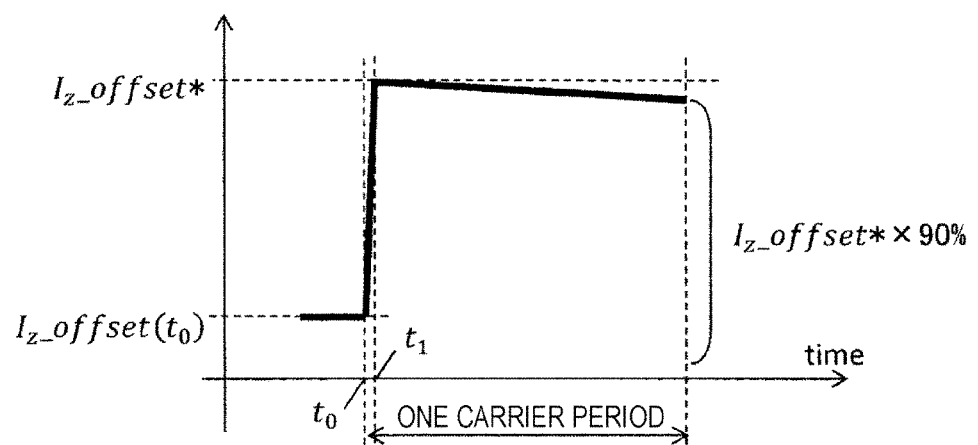
FIG. 9 is a diagram illustrating a transition of a 0-axis offset amount in one carrier period.

FIG. 9 illustrates a temporal change of Iz_offset when a control operation is performed as described above. For simplicity, when t0 and Iz_offset (to) are set to zero, an approximate waveform of Iz_offset determined from Formula (8) reaches zero at time 0 and reaches a final value Vz/r (A) at time T. When an example is given on the assumption of a motor for EV•HEV, a time constant of a d-axis and q-axis is normally several 10 ms. Meanwhile, as a result of an extremely small 0-axis inductance when compared to the d-axis and q-axis, a time constant τz of the 0-axis current is about 1 ms, and a winding resistance is on the order of mΩ. When Vz=400 V is set as a drive device for the motor for EV•HEV, the 0-axis current rises at a slope of 400,000 (A) per 1 ms. When the desired value Iz_offset* of Iz_offset is set to 100 A order, a time required for raising and lowering is on the order of several μs.

After Iz_offset reaches the desired value Iz_offset*, Iz_offset is switch to the ZCMM space vector, and Iz_offset is spontaneously attenuated. In this instance, a natural decay time constant is on the order of 1 ms. When a carrier period is set to 100 s which is frequently used as a carrier period of the drive device for the motor for EV•HEV, about 90% (=exp(−100 μs/1 ms)) of the desired value Iz_offset* of Iz_offset is held until a subsequent carrier period starts. For this reason, when a waveform of Iz_offset is macroscopically viewed, the waveform may be regarded as a stepwise form in which the desired value Iz_offset* is reached in an extremely short time in one carrier period, and a level thereof is maintained thereafter.

Among the non-ZCMM space vectors described above, the space vectors PPP0 and MMM0 are zero in magnitude in an a-axis direction and in a β-axis direction, and the remaining space vectors are not zero in magnitude in at least one of the a-axis direction and in the β-axis direction. As described above, since a time for using the non-ZCMM space vector is about several μs, control of a d-axis current Id and a q-axis current Iq is not greatly affected, and thus non-ZCMM space vectors other than the space vectors PPP0 and MMM0 may be used. However, in view of completely eliminating an influence on the α-axis direction and in the β-axis direction, it is more preferable to use the space vectors PPP0 and MMM0 in preference.

Figure 10:
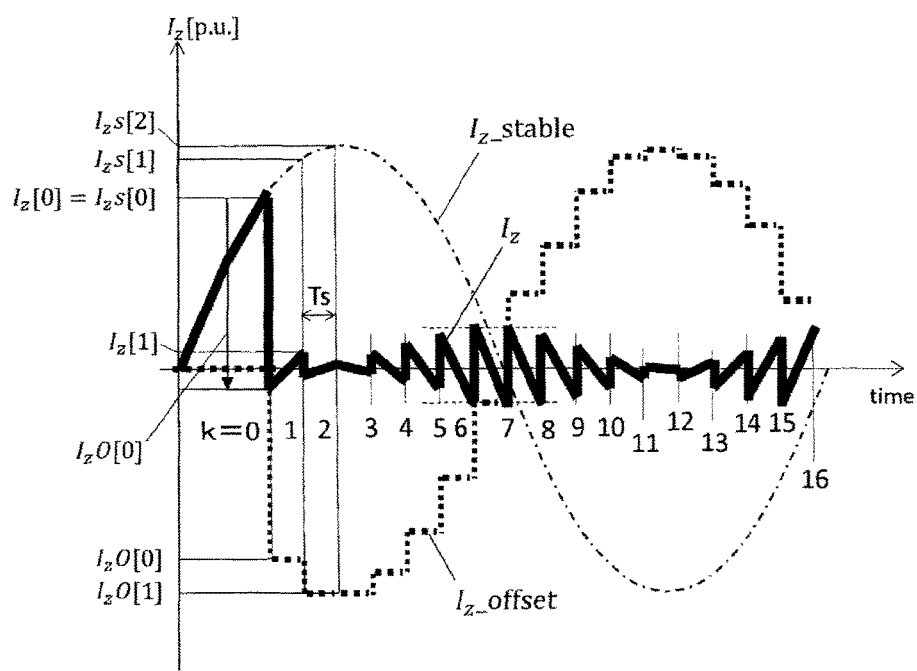
FIG. 10 is a diagram for description of suppression of the 0-axis current standing wave.

FIG. 10 is a diagram for description of Iz_offset when the 0-axis current Iz is adjusted to zero. As illustrated in FIG. 9, it takes several μs before Iz_offset reaches the desired value Iz_offset*, and Iz_offset spontaneously attenuates thereafter. However, in FIG. 10, details thereof are omitted and Iz_offset is indicated by a series of stepwise waveforms. A case in which a desired value of Iz is not zero may be simply regarded as a state in which the desired value is offset, and the same description as a description below is satisfied.

FIG. 10 illustrates a case in which a control operation proposed by the invention is performed after time k=0. A period until a numerical value at time k rises by one is one carrier period Ts. A heavy line indicates the 0-axis current Iz, an alternate long and short dashed line indicates Iz_stable, and a broken line indicates Iz_offset. IzS[0], IzS[1], and IzS[2] indicate values of Iz_stable at moments of time k=0, k=1, and k=2, respectively. A waveform of IzS is obtained in advance, and a state of the waveform is stored in the form of a table, a function, etc. IzO[0] and IzO[1] indicate values of Iz_offset at moments of time k=0 and k=1, respectively. Iz[0] and Iz[1] indicate values of Iz at moments of time k=0 and k=1, respectively.

Iz_offset at time k=0 is set to IzO[0]=−(IzS[0]+IzS[1])/2. Since the 0-axis current Iz is a sum of Iz_stable and Iz_offset, the 0-axis current Iz at time k=0 is Iz[0]=IzS[0]+

IzO[0]=−(IzS[1]−IzS[0])/2. Furthermore, at time k=1, Iz_stable changes from IzS[0] to IzS[1], and thus Iz[1]=Iz[0]+(IzS[1]−IzS[0])=+(IzS[1]−IzS[0])/2. A value of the 0-axis current Iz at an intermediate time between time k=0 and time k=1 is almost midway between Iz[0] and Iz[1]since the passage of time is extremely short. That is, the 0-axis current Iz at the intermediate time is substantially zero, and a change amount of the 0-axis current Iz (that is, a change amount of Iz_stable) is proportionally distributed with respect to the X axis. Therefore, an average value of the 0-axis current Iz during this carrier period may be made almost zero.

At time k=1, IzO[1]=−(IzS[1]+IzS[2])/2 is set. The 0-axis current Iz at time k=1 is Iz[1]=IzS[1]+IzO[1]=−(IzS[2]−IzS[1])/2. Furthermore, at time k=2, Iz_stable changes from IzS[1] to IzS[2], and thus Iz[2]=Iz[1]+(IzS[2]−IzS[1])=+(IzS[2]−IzS 1])/2. That is, a change amount of Iz_stable during this carrier period is proportionally distributed with respect to the X axis, and an average value of the 0-axis current Iz during this carrier period may be made almost zero.

Similarly, Iz_offset is set after time k=1. That is, IzO[k]=−(IzS[k]+IzS[k+1])/2 is set. As a result, an amount of change of Iz_Stable in each carrier period is proportionally distributed with respect to the X axis, and the 0-axis current Iz is adjusted to zero. When Iz_Stable is not a simple sinusoidal wave, Iz_offset=−(IzS[max]+IzS[min])/2 is preferably determined using a maximum value IzS[max] and a minimum value IzS[min] during the carrier period.

In order to reduce switch loss of the inverter, it is preferable to reduce the number of times of switching as possible. In an example illustrated in FIG. 10, the 0-axis current Iz is sufficiently close to zero at times k=2 and 3 and at time k=11 and 12. In addition, a change amount in Iz_stable during each carrier period is minimal. Therefore, in this section, even when a period of using the non-ZCMM space vector described above is omitted, the 0-axis current Iz does not greatly deviate from zero. That is, the period of using the non-ZCMM space vector may not correspond to all carrier periods, and it is more preferable to appropriately thin out non-ZCMM space vectors such that inverter loss and loss due to the 0-axis current Iz are evaluated to obtain a more advantageous result.

The above-described series of schemes will be referred to as slice control in the present embodiment. One carrier period may be divided into several parts to use a plurality of sets of two periods (a period using ZCMM space vectors and a period using non-ZCMM space vectors). In addition, when Iz_offset is sufficiently close to a desired value, the period of non-ZCMM space vectors may be omitted.

(Main Part in Controller)

Figure 11:
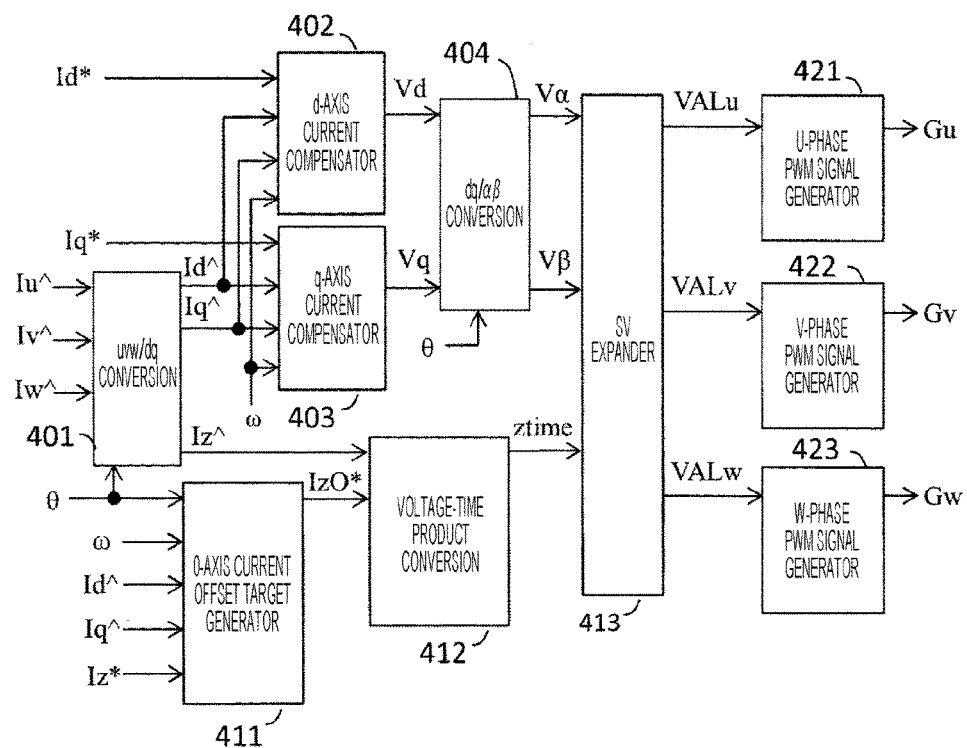
FIG. 11 is a diagram illustrating main components of a controller.

In the above description, a point of the slice control in the present embodiment has been described. Hereinafter, a description will be given of a configuration of the controller 150 in which the slice control is performed, and it will be described that the 0-axis current Iz may be controlled in parallel while controlling the d-axis current Id and the q-axis current Iq. FIG. 11 is a diagram illustrating a main configuration of the controller 150. Current measurement values Iu^, Iv^, and Iw^ of a U phase, a V phase, and a W phase and a motor phase θ are input to a UVW/dq conversion block 401. The UVW/dq conversion block 401 converts the current measurement values Iu^, Iv^, and Iw^ into a dq-axis current based on Formula (10) below, and outputs a d-axis current detection value Id^ and a q-axis current detection value Iq^, and a 0-axis current measurement value Iz^.

[Formula 7]

$$\begin{pmatrix} I_d \\ I_q \\ I_z \end{pmatrix} = \sqrt{\frac{2}{3}} \cdot \begin{pmatrix} \cos(\theta) & \cos\left(\theta - \frac{2}{3}\pi\right) & \cos\left(\theta + \frac{2}{3}\pi\right) \\ -\sin(\theta) & -\sin\left(\theta - \frac{2}{3}\pi\right) & -\sin\left(\theta + \frac{2}{3}\pi\right) \\ \frac{1}{\sqrt{2}} & \frac{1}{\sqrt{2}} & \frac{1}{\sqrt{2}} \end{pmatrix} \cdot \begin{pmatrix} I_u \\ I_v \\ I_w \end{pmatrix} \quad (10)$$

A d-axis current compensator block 402 receives a d-axis current command Id* generated by a block (not illustrated), a d-axis current detection value Id^ and a q-axis current detection value Iq^ output from the UVW/dq conversion block 401, and motor rpm ω obtained through a circuit (not illustrated), and outputs a d-axis voltage command Vd. A q-axis current compensator block 403 receives a q-axis current command Iq* generated by a block (not illustrated), the d-axis current detection value Id^ and the q-axis current detection value Iq^ output from the UVW/dq conversion block 401, and motor rpm ω, and outputs a d-axis voltage command Vd. Details of processing of the d-axis current compensator block 402 and the q-axis current compensator block 403 will be described below.

A dq/αβ conversion block 404 receives a d-axis current command Vd from the d-axis current compensator block 402, a q-axis current command Vq from the q-axis current compensator block 403, and the motor phase θ obtained through a circuit (not illustrated), performs dq/αβ conversion processing based on Formula (11) below, and outputs an a-axis voltage command Va and a β-axis voltage command Vβ.

[Formula 8]

$$\begin{pmatrix} V_\alpha \\ V_\beta \end{pmatrix} = \begin{pmatrix} \cos(\theta) & -\sin(\theta) \\ \sin(\theta) & \cos(\theta) \end{pmatrix} \cdot \begin{pmatrix} V_d \\ V_q \end{pmatrix} \quad (11)$$

The UVW/dq conversion block 401, the d-axis current compensator block 402, the q-axis current compensator block 403, and the dq/αβ conversion block 404 correspond to programs and are executed at a predetermined period in a microcomputer. In the present embodiment, description is given on the assumption that a program execution period is the same as the carrier period Ts.

A 0-axis current offset target generator block 411 receives the motor phase θ, the motor rpm w, the d-axis current detection value Id^, and the q-axis current detection value Iq^, receives a 0-axis current target value Iz* from a block (not illustrated), and outputs a 0-axis current offset target value IzO*. Details of a process of generating the 0-axis current offset target value IzO* will be described below.

A voltage-time product conversion block 412 outputs an operating time (time width of an action period) ztime of the non-ZCMM space vector based on the 0-axis current offset target value IzO* from the 0-axis current offset target generator block 411 and a 0-axis current detection value Iz^ from the UVW/dq conversion block 401. Details of a process of calculating the operating time ztime in the voltage-time product conversion block 412 will be described below. A SV expansion period block 413 outputs U-phase counter information VALu, V-phase counter information VALv, and W-phase counter information VALw based on the α-axis voltage command Vα and the β-axis voltage command Vβ from the dq/αβ conversion block 404 and the operating time ztime from the voltage-time product conversion block 412.

The 0-axis current offset target generator block 411, the voltage-time product conversion block 412, and the SV expander block 413 correspond to programs and are executed at a predetermined period in the microcomputer. In the present embodiment, description is given on the assumption that a program execution period is the same as the carrier period Ts.

A U-phase PWM signal generator block 421 outputs a gate signal Gu based on the U-phase counter information VALu from the SV expansion period block 413. A V-phase PWM signal generator block 422 outputs a gate signal Gv based on the V-phase counter information VALv from the SV expansion period block 413. A W-phase PWM signal generator block 423 outputs a gate signal Gw based on the W-phase counter information VALw from the SV expansion period block 413. The U-phase PWM signal generator block 421, the V-phase PWM signal generator block 422, and the W-phase PWM signal generator block 423 are configured as hardware.

Hereinafter, details of each block illustrated in FIG. 11 will be described below.

(Description of Current Compensator Blocks 402 and 403)

Figure 12:
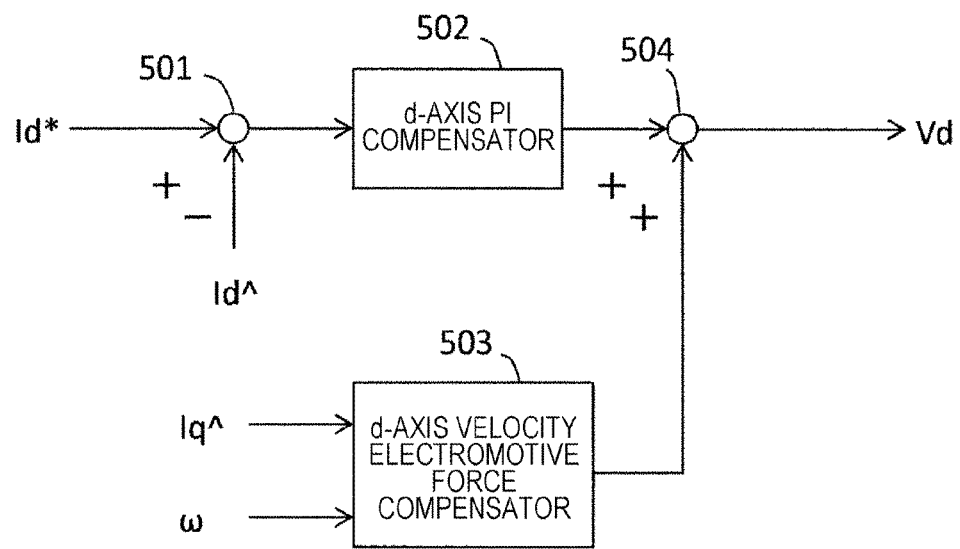
FIG. 12 is a diagram for description of processing of a d-axis current compensator block.

First, details of processing of the d-axis current compensator block 402 and the q-axis current compensator block 403 will be described. FIG. 12 is a diagram for description of processing of the d-axis current compensator block 402. A signal obtained by subtracting the d-axis current detection value $Id^\wedge$ from the d-axis current command Id* is input to a d-axis PI compensator block 502 from a d-axis deviation adjuster 501. The d-axis PI compensator block 502 performs PI compensation on the signal obtained by subtracting the d-axis current detection value $Id^\wedge$ from the d-axis current command Id* and outputs a d-axis PI compensation value. When there is a difference between the d-axis current command Id* and the d-axis current detection value $Id^\wedge$, the d-axis PI compensator block 502 generates the d-axis PI compensation value to fill the difference. Therefore, the d-axis detection value $Id^\wedge$ approaches the d-axis current command Id* over time.

In parallel with processing of the d-axis PI compensator block 502, a d-axis velocity electromotive force compensator block 503 calculates a d-axis velocity electromotive force compensation value based on the q-axis current detection value $Iq^\wedge$ and the motor rpm ω. Since the d-axis velocity electromotive force compensator block 503 generates a d-axis velocity electromotive force voltage value to cancel an interference voltage due to the q-axis current, a response of the d-axis current is improved. Then, the d-axis voltage command Vd is obtained by combining the d-axis PI compensation value and the d-axis velocity electromotive force compensation value using a d-axis voltage adjuster 504. Here, the q-axis current detection value $Iq^\wedge$ is used to obtain the d-axis velocity electromotive force compensation value. However, a q-axis current target value Iq* may be used.

Figure 13:
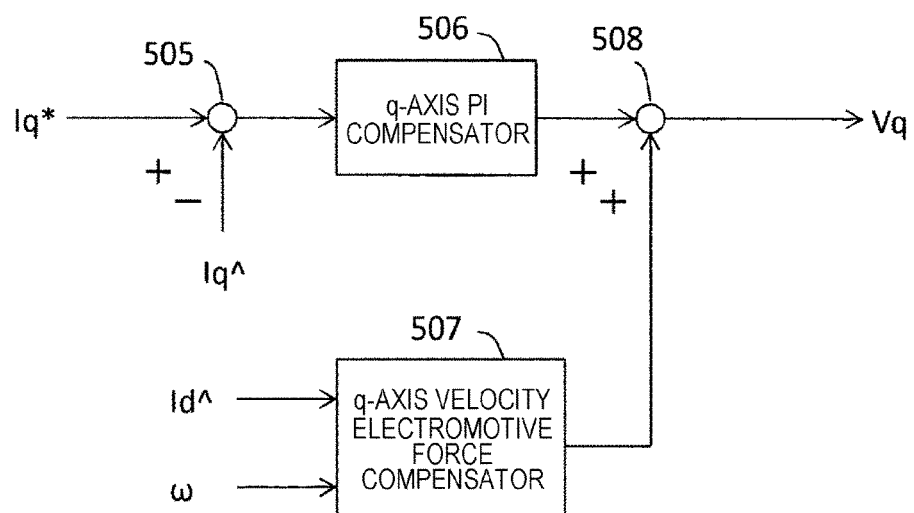
FIG. 13 is a diagram for description of processing of a q-axis current compensator block.

FIG. 13 is a diagram for description of processing of the q-axis current compensator block 403. A signal obtained by subtracting the q-axis current detection value $Iq^\wedge$ from the q-axis current command Iq* is input to a q-axis PI compensator block 506 from a q-axis deviation adjuster 505. The q-axis PI compensator block 506 performs PI compensation on the signal obtained by subtracting the q-axis current detection value $Iq^\wedge$ from the q-axis current command Iq* and outputs a q-axis PI compensation value. When there is a difference between the q-axis current command Iq* and the q-axis current detection value $Iq^\wedge$, the q-axis PI compensator block 506 generates a q-axis PI compensation value to fill this difference. Therefore, a q-axis detection value $Iq^\wedge$ approaches a q-axis current command Id* over time.

In parallel with processing of the q-axis PI compensator block 506, a q-axis velocity electromotive force compensator block 507 calculates a q-axis velocity electromotive force compensation value based on the d-axis current detection value $Id^\wedge$ and the motor rpm ω. Since the q-axis velocity electromotive force compensator block 507 generates a q-axis velocity electromotive force voltage value to cancel an interference voltage due to the d-axis current and cancel a fundamental wave induced voltage, the q-axis current is improved. Then, the q-axis voltage command Vq is obtained by combining the q-axis PI compensation value and the q-axis velocity electromotive force using a q-axis voltage adjuster 508. Here, the d-axis current detection value $Id^\wedge$ is used to obtain the q-axis velocity electromotive force compensation value. However, a d-axis current target value Id* may be used.

(Description of 0-Axis Current Offset Target Generator Block 411)

Figure 14:
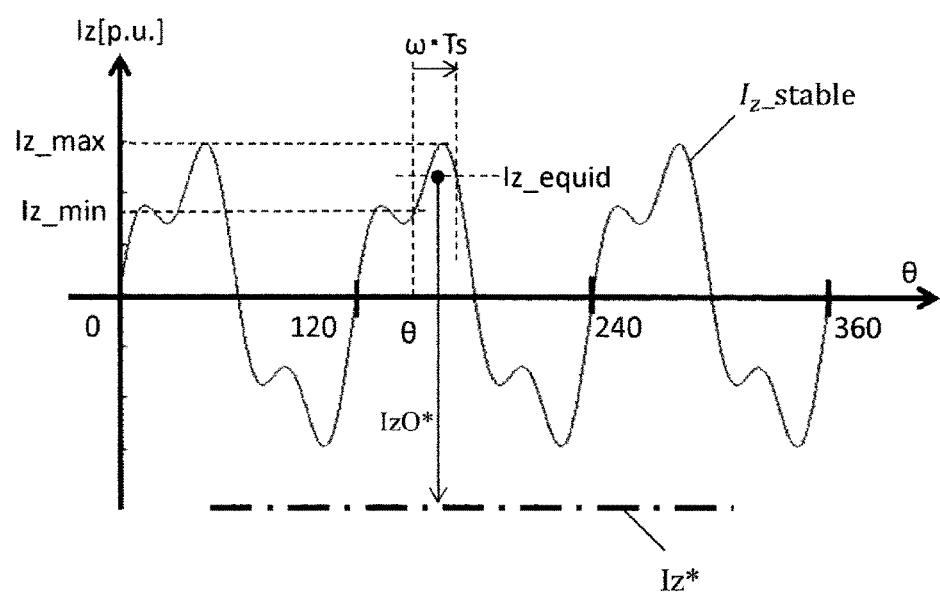
FIG. 14 is a diagram for description of an operation of a 0-axis current offset target generator.
Figure 15:
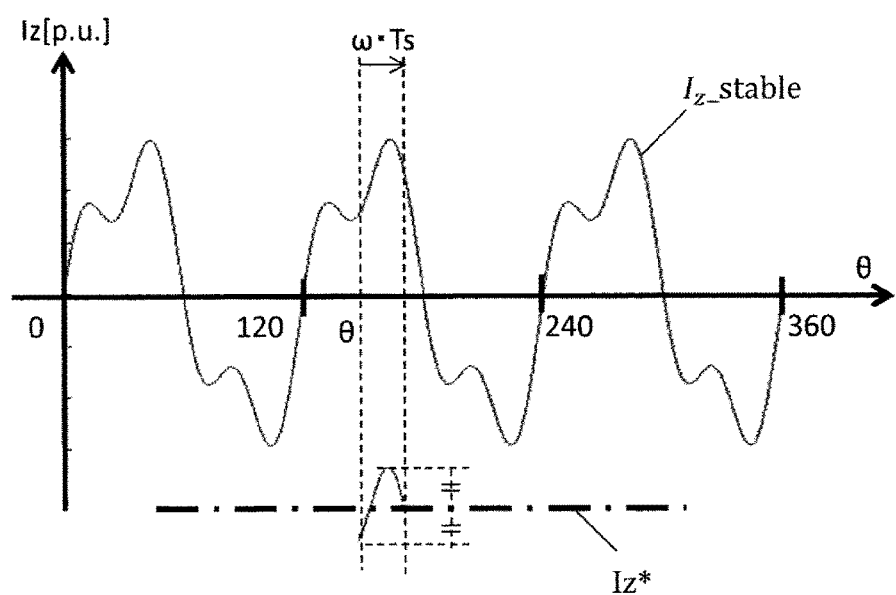
FIG. 15 is a diagram for description of an operation of the 0-axis current offset target generator.
Figure 16:
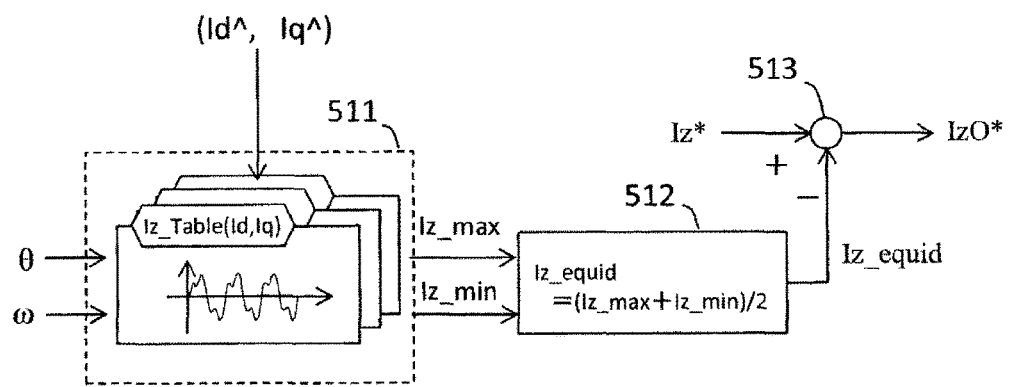
FIG. 16 is a diagram illustrating an internal configuration of the 0-axis current offset target generator.

FIGS. 14 to 16 are diagrams for description of a target value generation process in the 0-axis current offset target generator block 411. FIG. 14 is a diagram illustrating a waveform of a 0-axis current standing wave Iz_stable when a horizontal axis corresponds to the motor phase θ. The waveform of the 0-axis current standing wave Iz_stable is unique to the motor and uniquely determined when the d-axis current and the q-axis current are determined. When the motor phase θ and motor rpm w are known, it is possible to figure out an advance of the motor phase from the current motor phase θ in the carrier period Ts, and a range of the motor phase in the carrier period Ts is determined to be [θ to θ+ω·Ts]. In FIG. 14, two vertical dashed lines indicate this range.

The 0-axis current offset target generator block 411 searches a maximum value Iz max and a minimum value Iz min of the 0-axis current standing wave Iz_stable in the motor phase range [θ to θ+ω·Ts], and obtains a median value Iz_equid thereof. Then, a difference between the 0-axis current target value Iz* and the median value Iz_equid is set to the 0-axis current offset target value IzO*. When Iz_offset is made equal to the 0-axis current offset target value IzO* in a procedure described below, a change in 0-axis current (a change in 0-axis current standing wave Iz_stable) is proportionally divided by ½ above and below the target value with respect to the 0-axis current target value Iz* as illustrated in FIG. 15.

FIG. 16 summarizes a flow of the target value generation process described above. A pattern of the 0-axis current standing wave Iz_stable is stored as a table in a 0-axis current standing wave table set 511. Since the 0-axis current standing wave Iz_stable is determined by the d-axis current and the q-axis current as described above, a plurality of tables are prepared for each dq-axis current so that necessary accuracy is obtained. An initial process of the 0-axis current offset target generator block 411 is to select a table corresponding to the dq-axis current detection values $Id^\wedge$ and $Iq^\wedge$. The maximum value Iz max and the minimum value Iz min are searched from the selected table, and the values are input to a 0-axis current standing wave median value calculation block 512. The 0-axis current standing wave median value calculation block 512 calculates the median value Iz_equid from the maximum value Iz max and the minimum value Iz min. Then, the 0-axis current offset target value IzO* is obtained by calculating a difference between the 0-axis current target value Iz* and the median value Iz_equid by a 0-axis current offset target calculation differentiator 513. Even though data of the 0-axis current standing wave Iz_stable is held in a table form here, the data may be held as a function.

(Description of Voltage-Time Product Conversion Block 412)

Next, a detailed description will be given of processing in the voltage-time product conversion block 412. The voltage-time product conversion block 412 calculates an operating time of the non-ZCMM space vector necessary to make the 0-axis current offset amount (Iz_offset) equal to the 0-axis current offset target value IzO*. In this case, in Formula (8), "Iz_offset" may be replaced with "IzO*", "Iz_offset(t0)" may be replaced with "Iz^", "t−t0" may be replaced with ztime, and ztime obtained by solving the equation may be used as the operating time. In this instance, the operating time ztime is expressed by Formula (12).

[Formula 9]

$$ztime = -\tau_z \cdot \log \frac{I_z O^* - \frac{V_z}{r}}{I_z^{\wedge} - \frac{V_z}{r}} \quad (12)$$

Figure 17:
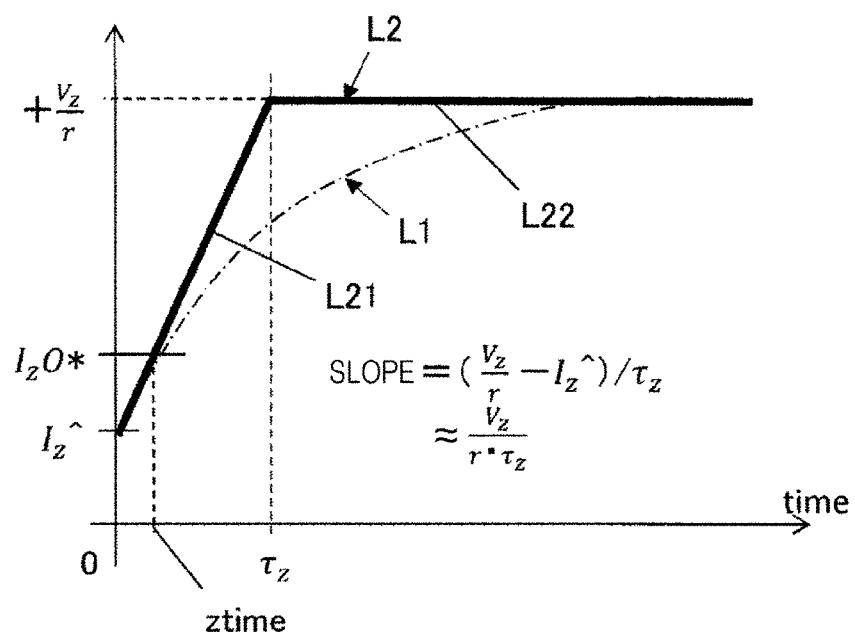
FIG. 17 is a diagram illustrating a step input response of the 0-axis current offset amount.

However, it is cumbersome to implement "function log", etc. by a program, and thus the operating time ztime may be determined as below. A curve L1 indicated by an alternate long and short dashed line of FIG. 17 shows a response waveform obtained when "Iz_offset(t0)" is replaced with "Iz^", and t0=0 is set in Formula (8). The curve has a value of Iz^ at t=0, and approximately has a value of Vz/r at t>>τz. Here, the response waveform L1 is approximated by a response waveform L2 represented by straight lines L21 and L22. The straight line L21 at 0≤t≤τz corresponds to a segment joining coordinates (0, Iz^) and coordinates (τz, Vz/r), and a slope thereof is (Vz/r−Iz^)/τz. In addition, the straight line L22 at τz≤t represents a straight line parallel to a horizontal axis as coordinates (0, Vz/r).

Here, since Vz/r>>Iz^, the slope of the straight line L21 may be approximated to Vz/(r·τz). In this case, (IzO*−Iz^)/ztime=Vz/(r·τz) is satisfied. Therefore, when a difference between IzO* and Iz^ is figured out, ztime may be determined from this equation. As described above, since the time constant τz of the 0-axis current is about 1 ms, and the operating time ztime for making Iz_offset equal to the 0-axis current offset target value IzO* is on the order of several µs, a deviation between the waveform L1 and the waveform L2 is extremely small.

Figure 18:
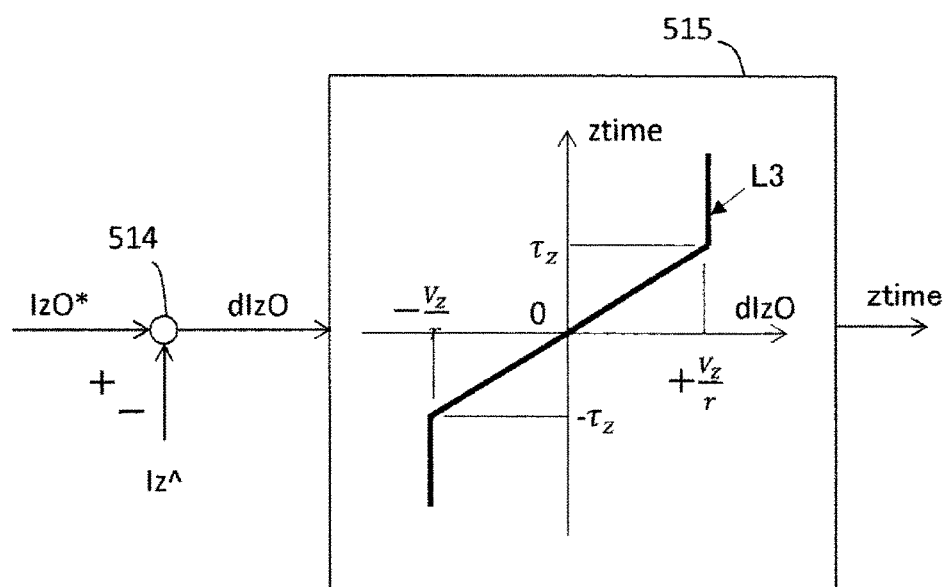
FIG. 18 is a diagram illustrating an internal configuration of a voltage-time product conversion block.

FIG. 18 is a summary of the above-described conversion processing, and is a diagram illustrating an internal configuration of the voltage-time product conversion block 412. A waveform L3 illustrated in a non-ZCMM operating time calculation block 515 corresponds to the waveform L2 illustrated in FIG. 17. However, a vertical axis and a horizontal axis are exchanged. In addition, the vertical axis is replaced with ztime, and the horizontal axis is replaced with dIzO (=IzO*−Iz^). Therefore, a straight line at −Vz/r≤dIzO≤+Vz/r is expressed by ztime=dIzO·τz/(Vz/r).

A 0-axis current flow amount calculation differentiator 514 obtains a difference dIzO by subtracting the 0-axis current detection value Iz^ from the 0-axis current offset target IzO*. Then, the non-ZCMM operating time calculation block 515 calculates the operating time ztime. When the operating time ztime is a positive value, the value indicates that a space vector in a list of non-ZCMM space vectors assigning a positive voltage to the 0-axis voltage Vz described above is used. Conversely, when the operating time ztime is a negative value, the value indicates that a space vector in a list of non-ZCMM space vectors assigning a negative voltage to the 0-axis voltage Vz is used.

In the present embodiment, when a non-ZCMM space vector is used, PPP0 is presumed as a space vector assigning a positive 0-axis voltage Vz and MMM0 is presumed as a space vector assigning a negative 0-axis voltage Vz. However, use of other space vectors aggregated into two lists described above is not ruled out. It should be noted that a magnitude of the 0-axis voltage Vz changes when other space vectors are used.

(Description of U-Phase PWM Signal Generator Block 421)

Next, the U-phase PWM signal generator block 421 will be described with reference to FIG. 19. The V-phase PWM signal generator block 422 and the W-phase PWM signal generator block 423 merely have different signal names and have the same structure. A carrier generator 451 illustrated in FIG. 19 needs to be synchronized with the U-phase PWM signal generator block 421, the V-phase PWM signal generator block 422, and the W-phase PWM signal generator block 423. The U-phase PWM signal generator block 421 develops a U-phase counter information VALu signal obtained from the SV expander block 413 by a signal separator (not illustrated) to obtain the following comparison values.

Figure 19:
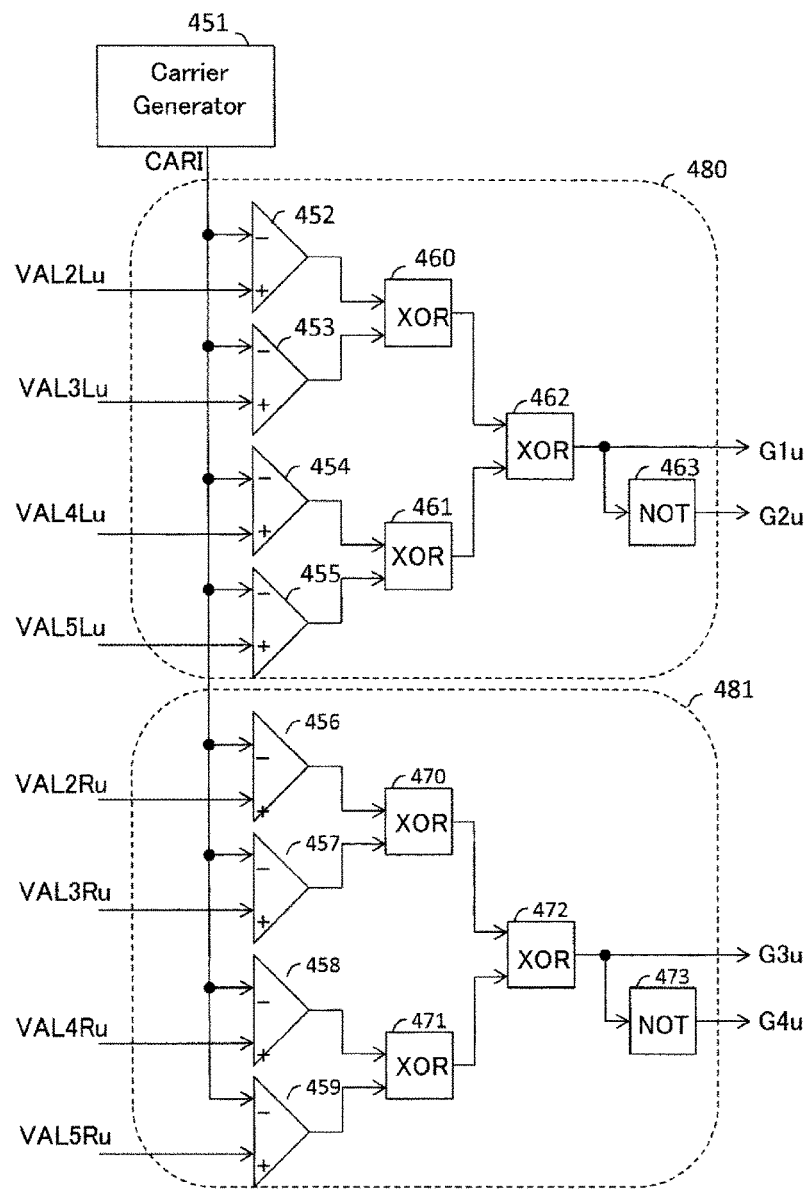
FIG. 19 is a diagram illustrating an internal configuration of a PWM signal generator block.

VAL2Lu, VAL3Lu, VAL4Lu, VAL5Lu,
VAL2Ru, VAL3Ru, VAL4Ru, VAL5Ru,

As illustrated in FIG. 19, a comparator 452 receives a carrier signal CARI from the carrier generator 451, and compares the received carrier signal CARI with the comparison value VAL2Lu. The comparator 452 outputs 1 when (VAL2Lu−CARI)≥0, and outputs 0 when (VAL2Lu−CARI)<0. Comparators 453 to 459 merely have different comparison values input thereto, and perform the same operation. Logic elements 460, 461, and 462 and logic elements 470, 471, and 472 output exclusive ORs with respect to two inputs. Logic elements 463 and 473 output negation of an input.

With the above configuration, the gate signals G1u, G2u, G3u, and G4u are obtained. In practice, there is a dead time assigning circuit for providing a non-overlap time before generating G1u and G2u. However, this circuit is not illustrated in FIG. 19. Similarly, in practice, there is a dead time assigning circuit for providing a non-overlap time before generating G3u and G4u. However, this circuit is not illustrated in FIG. 19. In addition, the gate signals G1u, G2u, G3u, and G4u are integrated by a circuit (not illustrated) to obtain a signal Gu.

Figure 20:
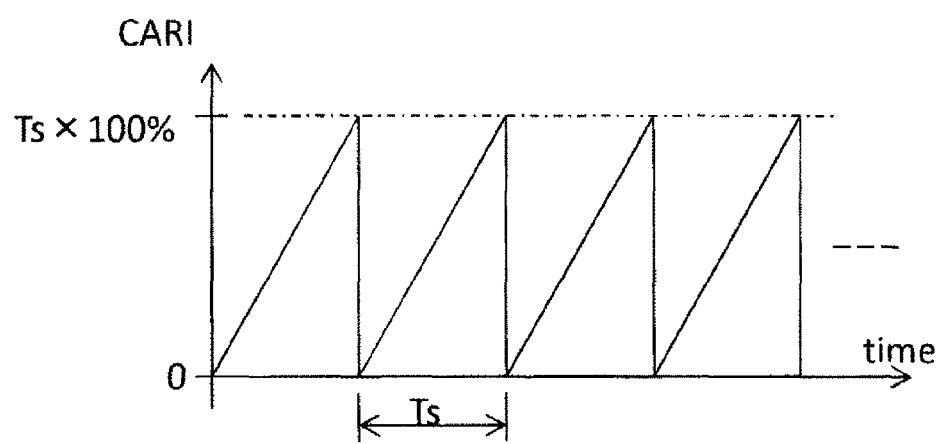
FIG. 20 is a diagram illustrating an output specification of a carrier generator.

FIG. 20 illustrates a signal specification of the carrier signal CARI output by the carrier generator 451. The carrier signal CARI is a triangular wave signal which changes from 0 to 100% in the carrier period Ts.

A description will be given of each comparison value and an output of the circuit based on a circuit configuration of FIGS. 19 and 20. Two broken line blocks 480 and 481 illustrated in FIG. 19 correspond to a basic unit of the circuit. The broken line block 480 and the broken line block 481 merely have different input/output signal names, and have the same response output with respect to an input comparison value. Thus, the broken line block 480 will be described below. Furthermore, since negation of the G1u signal is basically the G2u signal, a description will be restricted to the G1u signal with respect to each comparison value corresponding to an input.

Figure 21:
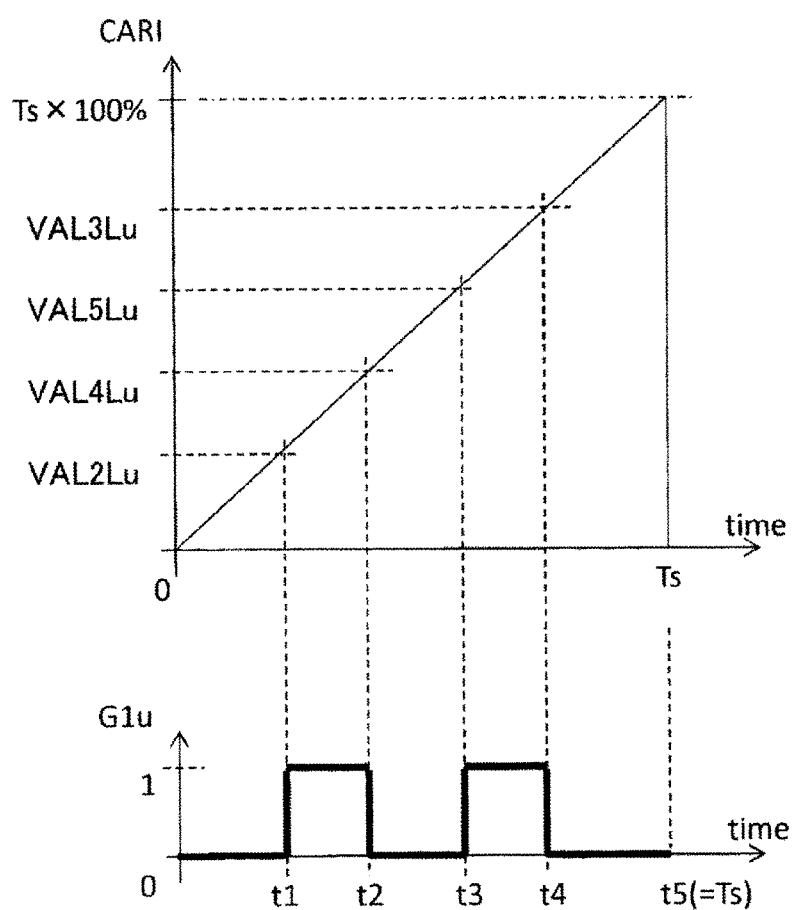
FIG. 21 is a diagram illustrating a correspondence relationship between a comparison value and a gate signal.

An upper graph of FIG. 21 illustrates comparison values with respect to the carrier signal CARI illustrated in FIG. 20. A lower graph of FIG. 21 illustrates an output of the signal G1u with respect to the comparison values VAL2Lu, VAL3Lu, VAL4Lu, and VAL5Lu. A time at which the respective comparison values VAL2Lu, VAL3Lu, VAL4Lu, and VAL5Lu match the carrier signal CARI corresponds to a signal change time of the lower graph. As illustrated in FIG. 21, the present embodiment has a characteristic in that two ON periods may be provided during one carrier period Ts.

FIG. 21 will be described in detail. At 0<t≤t1, since VAL2Lu, VAL3Lu, VAL4Lu, and VAL5Lu are all equal to or greater than CARI, all the outputs of the comparators 452 to 455 are 1. For this reason, 0 is output from the logic elements 460 and 461, and 0 is output from the logic element 462. Therefore, the signal G1u corresponds to 0. At t1<t≤t2, since VAL3Lu, VAL4Lu, and VAL5Lu are equal to or larger than CARI and VAL2Lu<CARI, an output of the comparator 452 is 0 and outputs of the comparators 453 to 455 are all 1. For this reason, 1 is output from the logic element 460, 0 is output from the logic element 461, 1 is output from the logic element 462. Therefore, the signal G1u corresponds to 1.

At t2<t≤t3, since VAL3Lu and VAL5Lu are equal to or larger than CARI and VAL2Lu and VAL4Lu are less than CARI, outputs of the comparators 452 and 454 are 0 and outputs of the comparators 453 and 455 are 1. For this reason, 1 is output from any one of the logic elements 460 and 461, and 0 is output from the logic element 462. Therefore, the signal G1u corresponds to 0. At t3<t≤t4, since VAL3Lu≥CARI and VAL2Lu, VAL4Lu, and VAL5Lu are less than CARI, outputs of the comparators 452, 454, and 455 are 0 and an output of the comparator 453 is 1. For this reason, 1 is output from the logic element 460, 0 is output from the logic element 461, 1 is output from the logic element 462. At t4<t≤t5, since VAL2Lu, VAL3Lu, VAL4Lu, and VAL5Lu are all less than CARI, all outputs of the comparators 452 to 455 are 0. For this reason, 0 is output from the logic elements 460 and 461, and 0 is output from the logic element 462. Therefore, the signal G1u corresponds to 0.

(Description of SV Expander Block 413)

Next, the SV expander block 413 will be described.

(First Step)

Figure 22:
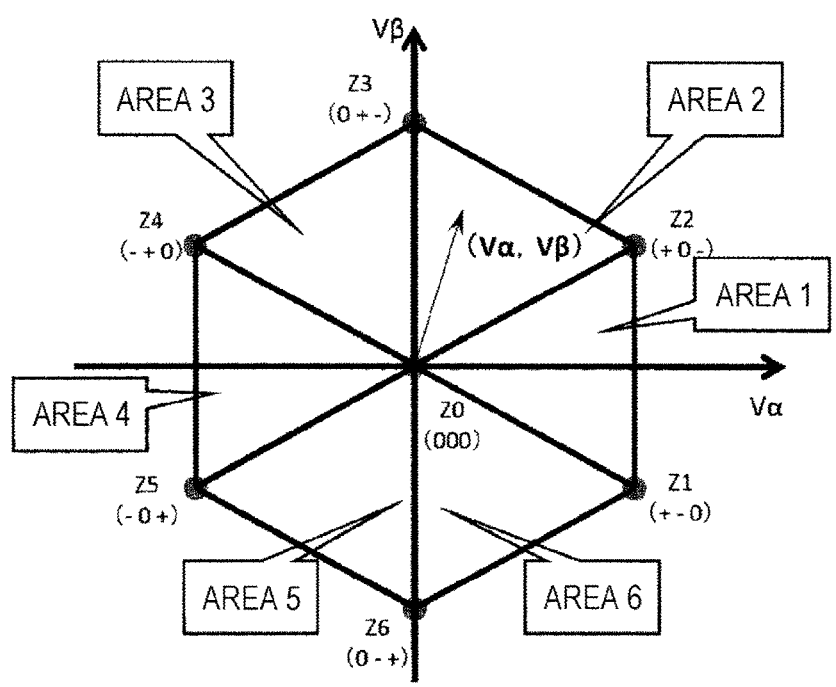
FIG. 22 is a diagram illustrating a representative example of a voltage on the αβ-axis.

First, a description will be given of a first step of developing the α-axis voltage command Vα and the β-axis voltage command Vβ into a nearest ZCMM space vector. As an example, a description will be given of a case in which the αβ-axis voltage commands Vα and Vβ are present in area 2 when areas 1 to 6 are defined as illustrated in FIG. 22. In this case, there are three nearest space vectors Z2, Z3, and Z0. The respective areas 1 to 6 are rotationally symmetric. For this reason, regardless of an area among the areas 1 to 6 in which the αβ-axis voltage commands Vα and Vβ are present, processing may be made common by superimposing on the area 1 by rotation processing. In this case, only a number of a corresponding space vector changes, and thus generalization may be made by replacing the space vectors with Z0, Zs, and Zd as illustrated in FIG. 23.

Figure 23:
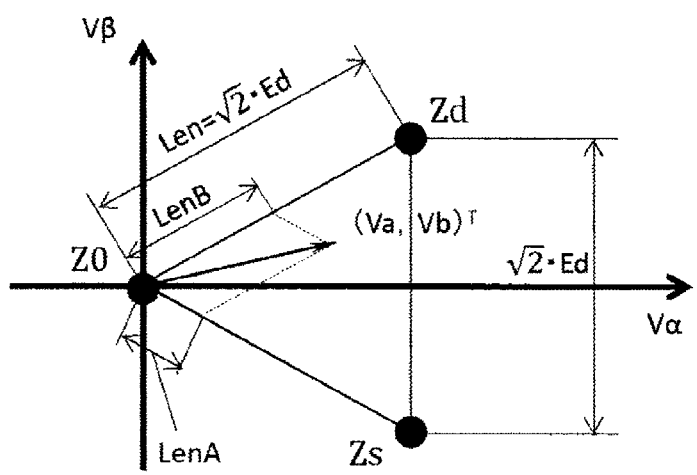
FIG. 23 is a diagram for description of a method of expanding a voltage vector into a space vector.

FIG. 24 is a table summarizing a correspondence between the space vectors Zs and Zd of FIG. 23 and space vectors for each area. A rotation angle θp for overlapping each area on a generalized area is also shown. Formula (13) below allows shift to the αβ-axis voltage commands Vα and Vβ of each area using the rotation angle θp. αβ-axis voltage commands after shifting to the generalized area are set to Va and Vb.

[Formula 10]

$$\begin{pmatrix} V_a \\ V_b \end{pmatrix} = \begin{pmatrix} \cos(\theta p) & \sin(\theta p) \\ -\sin(\theta p) & \cos(\theta p) \end{pmatrix} \cdot \begin{pmatrix} V_\alpha \\ V_\beta \end{pmatrix} \quad (13)$$

Here, expansion to a space vector means obtaining LenA and LenB illustrated in FIG. 23 and obtaining a ratio with respect to Len illustrated in the figure. Respective ratios are determined using Formulas (14) and (15) by geometric calculation. As shown in Formula (16), a remainder obtained by subtracting ratios LenA/Len and LenB/Len from 1 is a time ratio of the space vector Z0. Here, when values of Formulas (14) to (16) are defined as Br[1], Br[2], and Br[3], respectively, a space vector expansion equation of Va and Vb corresponds to Formula (17). When space vectors Zs and Zd in Formula (17) are rewritten using the table shown in FIG. 24, a space vector expansion equation of the αβ-axis voltage commands Vα and Vβ is obtained. In addition, when Br[1], Br[2], and Br[3] are multiplied by the carrier period Ts, times B[1], B[2], and B[3] for operating each space vector are obtained, which is summarized in Formula (18).

[Formula 11]

$$LenA/Len = \frac{1}{\sqrt{2} \cdot Ed} \cdot \left( \frac{Va}{\sqrt{3}} - Vb \right) \equiv Br[1] \quad (14)$$

$$LenB/Len = \frac{1}{\sqrt{2} \cdot Ed} \cdot \left( \frac{Va}{\sqrt{3}} + Vb \right) \equiv Br[2] \quad (15)$$

$$1 - (LenA + LenB)/Len = 1 - \frac{\sqrt{2}}{Ed} \cdot \frac{Va}{\sqrt{3}} \equiv Br[3] \quad (16)$$

$$\begin{pmatrix} V_a \\ V_b \end{pmatrix} = Br[1] \cdot Zs + Br[2] \cdot Zd + Br[3] \cdot Z0 \quad (17)$$

$$B[1] = Ts \cdot Br[1], B[2] = Ts \cdot Br[2], B[3] = Ts \cdot Br[3] \quad (18)$$

Figure 25:
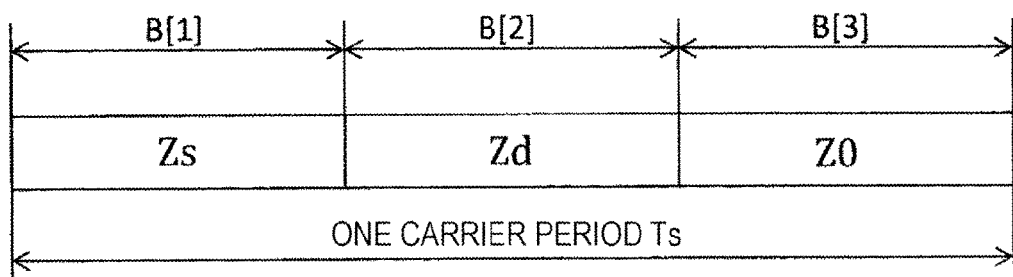
FIG. 25 is a diagram for description of an operating period of a ZCMM space vector in one carrier period.

FIG. 25 illustrates an image of operating times of space vectors during one carrier period. In FIG. 25, space vectors are described in an order of Zs, Zd, and Z0 during one carrier period. However, the order corresponds to a degree of freedom, and any order is acceptable.

(Second Step)

Figure 26:
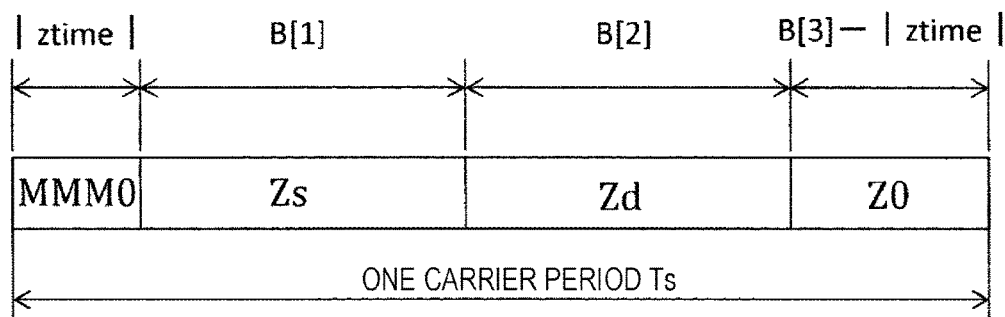
FIG. 26 is a diagram for description of an operating period of the ZCMM space vector and a non-ZCMM space vector in the one carrier period.

Next, as a second step, the non-ZCMM space vector is inserted into a space vector sequence illustrated in FIG. 25. FIG. 26 illustrates an example of adding the space vector MMM0 as the non-ZCMM space vector. When the space vector PPP0 is used, a positive voltage acts on the 0-axis voltage Vz. In addition, when the space vector MMM0 is used, a negative voltage acts on the 0-axis voltage Vz. Whether to use the space vector PPP0 or the space vector MMM0 may be determined by a sign of the action time ztime of the non-ZCMM space vector. In an example illustrated in FIG. 25, these space vectors PPP0 and MMM0 are inserted at a start of the carrier period. Thus, when the operating time of the non-ZCMM space vector expires, the 0-axis current spontaneously attenuates, and an intended 0-axis current waveform may be actualized.

Here, since the operating time ztime of the non-ZCMM space vector is added, operating times of the space vectors Zs, Zd, and Z0 need to be adjusted. Since the operating time ztime of the non-ZCMM space vector is originally a minute time, there is no significant influence regardless of which operating time of the space vectors Zs, Zd, and Z0 is reduced. However, more preferably, it is more reasonable to time-adjust the operating time of the space vector Z0 since the space vectors PPP0 and MMM0 have no voltage component in the α-axis direction, the space vector Z0 has no voltage component in the αβ-axis direction, and thus an influence of time adjustment due to insertion of the space vectors PPP0 and MMM0 is not exerted on control of the d-axis current Id and the q-axis current Iq at all.

(Third Step)

Next, as a third step, a method of determining a voltage applied to a motor winding wire will be described by taking states of the αβ-axis voltages Vα and Vβ illustrated in FIG. 22 as an example. Up to this point, space vector symbols Zs and Zd in the generalized area have been used. However, here, a description will be given using the space vectors illustrated in FIG. 22 since a detailed example needs to be described. In more detail, in the state of FIG. 22, Z2 is used instead of Zs, and Zd3 is used instead of Zd based on the table shown in FIG. 24. A space vector expansion equation of the αβ-axis voltages Vα and Vβ corresponds to Formula (19).

[Formula 12]

$$\begin{pmatrix} V_\alpha \\ V_\beta \end{pmatrix} = |ztime| \cdot MMM0 + Br[1] \cdot Z2 + Br[2] \cdot Z3 + (Br[3] - |ztime|)Z0 \quad (19)$$

Figure 27:
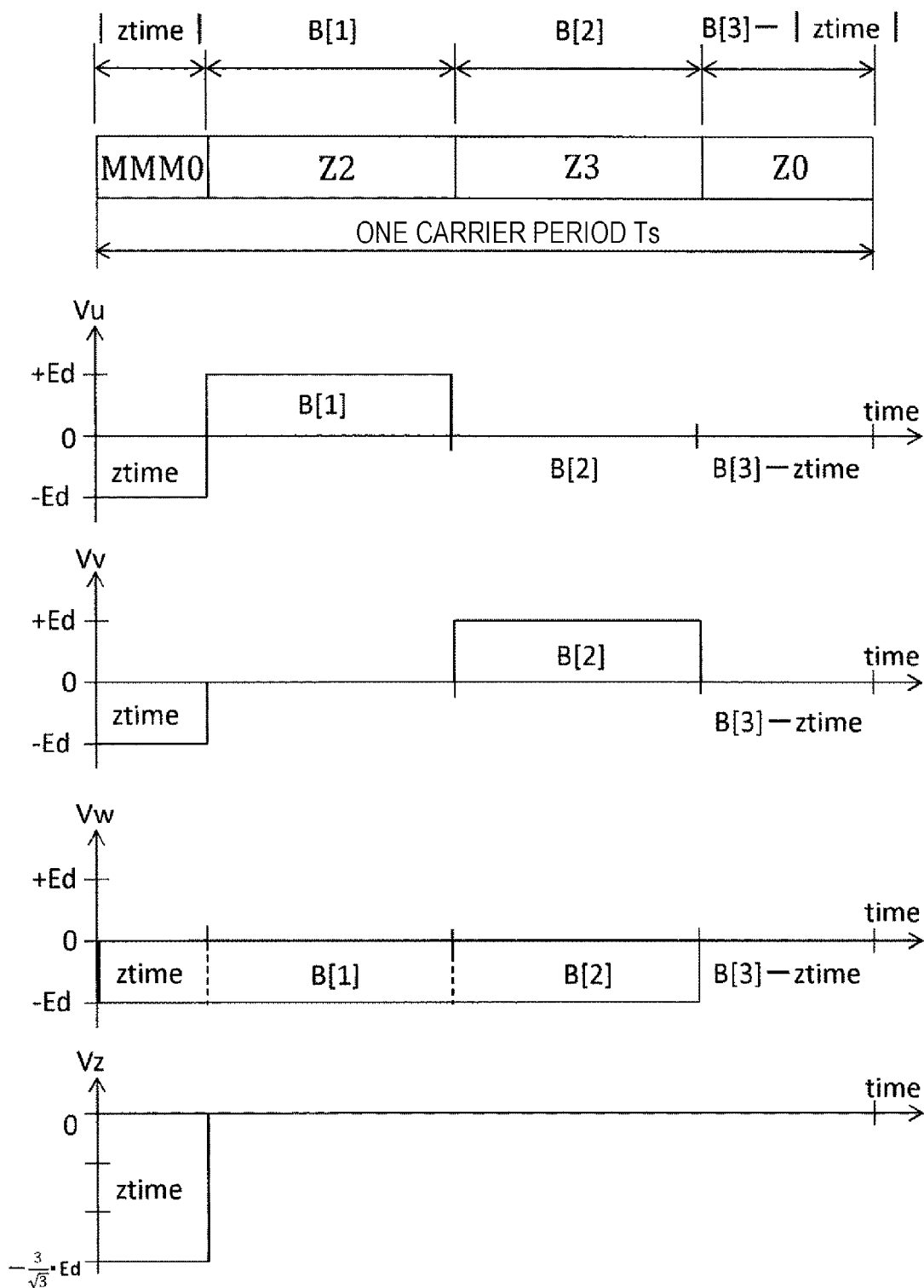
FIG. 27 is a diagram for description of a relationship between a space vector in the one carrier period and a voltage of each motor winding wire.

FIG. 27 illustrates an order and operating times of space vectors within one carrier period in the case of Formula (19) in a similar form to that of FIGS. 25 and 26. In FIG. 27, voltages Vu, Vv and Vw applied to the motor winding wire are collectively shown. Furthermore, the voltage of the 0-axis voltage Vz is also indicated. As illustrated in FIG. 27, MMM0 is used as a space vector in a period of ztime. MMM0 is a space vector assigning a voltage shown in Formula (20) below to the motor winding wire. That is, a sum of applied voltages Vu, Vv, and Vw does not become zero. The 0-axis voltage Vz of the space vector MMM0 is (−3/√3)·Ed as shown in FIG. 5.

$(Vu,Vv,Vw)=(-Ed,-Ed,-Ed)$ (20)

In a period of B[1] subsequent to the ztime period of FIG. 27, Z2 is used as a space vector. The space vector Z2 is a space vector assigning a voltage shown in Formula (21) to the motor winding wire. That is, a sum of applied voltages Vu, Vv and Vw is zero. The 0-axis voltage Vz of the space vector Z2 is zero.

$(Vu,Vv,Vw)=(+Ed,0,-Ed)$ (21)

In a period B[2] subsequent to the period B[1], Z3 is used as a space vector. The space vector Z3 is a space vector assigning a voltage shown in Formula (22) to the motor winding wire. That is, a sum of the applied voltages Vu, Vv and Vw is zero. The 0-axis voltage Vz of the space vector Z3 is zero.

$(Vu,Vv,Vw)=(0,+Ed,-Ed)$ (22)

In a period of (B[3]−ztime) subsequent to the period B[2], Z0 is used as a space vector. The space vector Z0 is a space vector assigning a voltage shown in Formula (23) to the motor winding wire. In this case, a sum of the applied voltages Vu, Vv and Vw is zero, and the 0-axis voltage Vz of the space vector Z0 is zero.

$(Vu,Vv,Vw)=(0,0,0)$ (23)

Therefore, a time transition of the U-phase winding wire voltage Vu of the motor is set to −Ed from a start of the one carrier period Ts to ztime, +Ed from ztime to (ztime+B[1]), and 0 from (ztime+B[1]) to an end of the one carrier period Ts. In addition, a time transition of the V-phase winding wire voltage Vv of the motor is set to −Ed from the start of the one carrier period Ts to ztime, 0 from ztime to (ztime+B[1]), +Ed from (ztime+B[1]) to (ztime+B[1]+B[2]), and 0 from (ztime+B[1]+B[2]) to the end of the one carrier period Ts. In addition, a time transition of the W-phase winding wire voltage Vw of the motor is set to −Ed from the start of the one carrier period Ts to (ztime+B[1]+B[2]), and 0 from (ztime+B[1]+B[2]) to the end of the one carrier period Ts. Here, when a waveform of the 0-axis voltage Vz is verified, as desired, the waveform corresponds to a negative value for a period from the start of the one carrier period Ts to ztime, and corresponds to 0 until the end of the one carrier period Ts after the operating time ztime has elapsed.

(Fourth Step)

Next, in a fourth step, a comparison value for generating a PWM gate signal is determined so as to be in an applied state according to the voltage of the motor winding wire determined in the third step. Among Vu, Vv, and Vw shown in FIG. 27, Vu will be described as an example. In an upper part of FIG. 28, a waveform of Vu of FIG. 27 is illustrated. Here, a gate signal for generating a voltage waveform of Vu is considered. Waveforms of the gate signals G1u and G3u are illustrated in middle and lower parts of FIG. 28. Since the gate signals G2u and G4u are negations of the gate signals G1u and G3u, respectively, a description thereof will be omitted.

From the start of the carrier period Ts to the end of the operating time ztime, −Ed is required as the U-phase voltage Vu. According to the table of FIG. 3, the applied voltage is −Ed when a combination corresponds to {Q1, Q2, Q3, Q4}={0, 1, 1, 0}. Therefore, in this period, the gate signal G1u needs to be set to 0, and the gate signal G3u needs be set to 1.

Subsequently, during a period from the end of the ztime period to (ztime+B[1]), +Ed is required as the U-phase voltage Vu. From the table of FIG. 3, {Q1, Q2, Q3, Q4}={1, 0, 0, 1}. Further, in this period, the gate signal G1u needs to be set to 1, and the gate signal G3u needs to be set to 0.

Next, during a period from an end of the (ztime+B[1]) period to the end of the carrier period Ts, 0 is required as the U-phase voltage Vu. From the table of FIG. 3, two combinations below may be selected in this case.

${Q1,Q2,Q3,Q4}=\{1,0,1,0\}$ ${Q1,Q2,Q3,Q4}=\{0,1,0,0\}$

Figure 28:
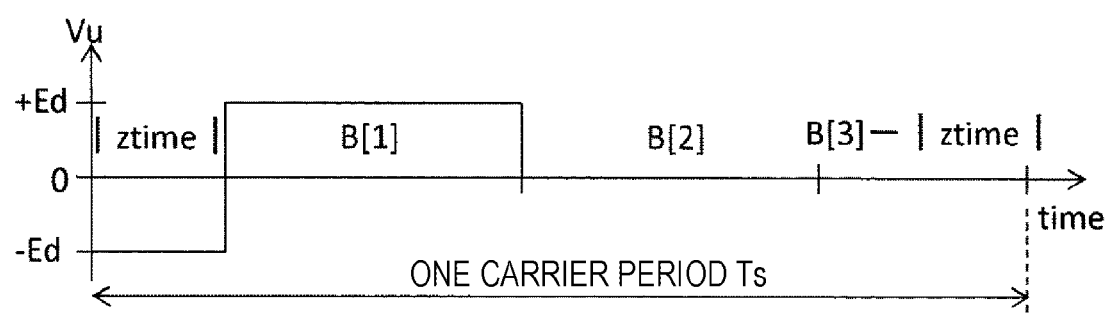
FIG. 28 is a diagram illustrating a relationship between a winding wire voltage and a gate signal.
Figure 28:
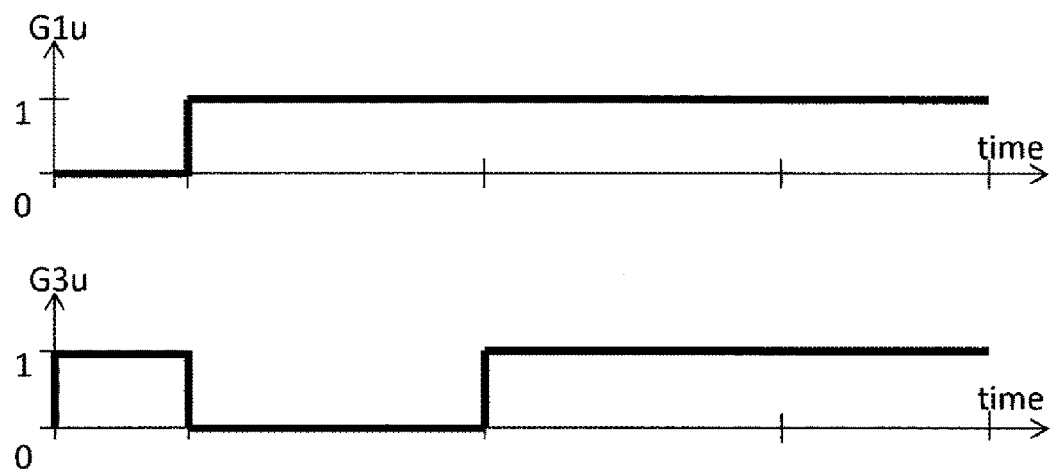

Both of these combinations may be selected. In FIG. 28, a first combination out of the above two combinations is selected. Therefore, in this period, the gate signal G1u is 1, and the gate signal G3u is 1.

Referring to the above description of FIG. 21, that is, a correspondence relationship between VAL2Lu, VAL3Lu, VAL4Lu, and VAL5Lu and the generated signal, VAL2Lu, VAL3Lu, VAL4Lu, and VAL5Lu may be set as in Formula (24) below to generate the gate signal G1u illustrated in FIG. 28. Ts×2 set as VAL3Lu, VAL4Lu, and VAL5Lu is a value set to delimit the carrier period Ts so as not to cause a compare match, and another value may be used as long as the value is large.

$VAL2Lu=ztime, VAL3Lu=Ts\times2, VAL4Lu=Ts\times2,$ and
$VAL5Lu=Ts\times2$ (24)

Meanwhile, VAL2Lu, VAL3Lu, VAL4Lu, and VAL5Lu may be set as in Formula (25) below to generate the gate signal G3u. In this case, the gate signal G3u needs to generate an ON signal twice in the one carrier period Ts as the waveform Gu3 illustrated in the lower part of FIG. 28. To this end, a configuration of a PWM signal generator illustrated in FIG. 19 needs to be adopted.

$$\text{VAL2}Lu=0, \text{VAL3}Lu=z\text{time}, \text{VAL4}Lu=z\text{time}+B[I],$$
$$\text{VAL5}Lu=Ts\times 2 \qquad (25)$$

As described above, the present embodiment has the single-phase inverters 160, 170, and 180 that individually apply voltages to the independent winding wires 210, 220, and 230 of the U, V, and W phases of the open winding type motor 200, and the controller 150 for controlling the single-phase inverters. In addition, a control operation is performed such that a sum of the voltages Vu, Vv, and Vw applied to the respective winding wires 210, 220, and 230 corresponds to a value other than zero using the non-ZCMM space vector as illustrated in FIG. 27, and a motor control operation is performed in a first period (ztime period) in which the 0-axis current Iz defined as an amount directly proportional to the sum of the currents of the respective winding wires is offset and a second period (a period represented by B[1]+B[2]+(B[3]− ztime)) in which the d-axis current Id and the q-axis current Iq are controlled using the ZCMM space vector. Further, it is possible to adjust the 0-axis current to a desired value while controlling the dq-axis current by alternately and repeatedly generating the first period and the second period.

For example, as illustrated in FIG. 10, an offset amount (for example, Iz[0], Iz[1], etc.) in the first period (ztime period) is set such that an amplitude of the 0-axis current Iz is smaller than an amplitude of the 0-axis current standing wave Iz_stable corresponding to a case in which the sum is zero. As a result, even when the three-phase unbalanced component Ez of the induced voltage of the motor is not zero, the 0-axis current Iz may be suppressed.

Further, as shown in the above-described Formula (6), the offset amount in the first period (ztime period) may be set to a value (anti-polarity) obtained by assigning a minus sign to the amplitude value of the 0-axis current standing wave Iz_stable. As a result, it is possible to adjust the 0-axis current Iz to a value close to zero, and to prevent an occurrence of the above-described conventional problem.

Furthermore, as illustrated in FIG. 10 and FIG. 15, when a value obtained by assigning a minus sign to the median value of the maximum value and the minimum value of the 0-axis current standing wave Iz_stable in the one carrier period Ts is set to the offset amount, an amplitude change of the 0-axis current Iz in the one carrier period Ts (that is, from a start of the first period to an end of the subsequent second period) is proportionally distributed above and below a desired value (for example, the 0-axis current target value Iz* of FIG. 15). As a result, the 0-axis current Iz in the period is almost zero.

In addition, as illustrated in FIG. 10, a control operation is performed to repeat the first period and the second period in a period in which the amplitude of the 0-axis current standing wave Iz_stable greatly changes, and control of the first period is omitted in a period in which the amplitude change is sufficiently small (for example, a period from time k=1 to k=3 of FIG. 10). In the period from time k=1 to k=3, the amplitude change of the 0-axis current standing wave Iz_stable is sufficiently small, and thus the 0-axis current Iz does not greatly deviate from zero even when control of the first period is omitted.

Furthermore, it is possible to eliminate generation of the α-axis voltage and the β-axis voltage, and to more effectively control the dq-axis current by performing a control operation such that all the applied voltages of the U-phase, V-phase, and W-phase winding wires in the first period correspond to +Ed, that is, by limiting the non-ZCMM space vector controlling the 0-axis current Iz to PPP0. In addition, a similar effect may be obtained when a control operation is performed such that all the applied voltages of the U-phase, V-phase, and W-phase winding wires in the first period correspond to −Ed by limiting the non-ZCMM space vector controlling the 0-axis current Iz to MMM0.

The above description is merely an example. When the invention is interpreted, there is no limitation on a correspondence relationship between description items of the above embodiment and description items of claims at all.

REFERENCE SIGNS LIST 100 inverter device
150 controller
160, 170, 180 single-phase inverter
200 motor
210, 220, 230 independent winding wire
401 UVW/dq conversion block
402 d-axis current compensator block
403 q-axis current compensator block
404 dq/αβ conversion block
411 0-axis current offset target generator block
412 voltage-time product conversion block
413 SV expander block
421 U-phase PWM signal generator block
422 V-phase PWM signal generator block
423 W-phase PWM signal generator block
451 carrier generator
501 d-axis deviation adjuster
502 d-axis PI compensator block
503 d-axis velocity electromotive force compensator block
504 d-axis voltage adjuster
505 q-axis deviation adjuster
506 q-axis PI compensator block
507 q-axis velocity electromotive force compensator block
508 q-axis voltage adjuster
511 0-axis current standing wave table set
512 0-axis current standing wave median value calculation block
513 0-axis current offset target calculation differentiator
514 0-axis current flow amount calculation differentiator
515 non-ZCMM operating time calculation block

The invention claimed is:

1. A motor drive device for an open winding type motor in which a stator winding includes three-phase windings, the motor drive device comprising:
a plurality of single-phase inverters provided for each of the windings to individually apply a voltage to a corresponding winding; and
a controller that controls each of the single-phase inverters provided for each of the windings,
wherein the controller adjusts a 0-axis current to a predetermined value by alternately and repeatedly generating a first period in which a sum of voltages applied to the respective windings is set to a value other than zero to offset the 0-axis current and a second period in which the sum of the voltages applied to the respective windings is set to zero, the 0-axis current being an amount directly proportional to a total sum value of phase currents, wherein an offset amount in the first period is set such that an amplitude change of the 0-axis current from a start of the first period to an end of the subsequent second period is proportionally distributed above and below the predetermined value.

2. The motor drive device according to claim 1, wherein an offset amount in the first period is set such that an amplitude of the 0-axis current is smaller than an amplitude of a 0-axis current standing wave corresponding to a case in which the sum is set to zero.

3. The motor drive device according to claim 2, wherein the offset amount in the first period is set to a value obtained by assigning a minus symbol to an amplitude value of the 0-axis current standing wave.

4. The motor drive device according to claim 1, wherein the controller controls a d-axis current and a q-axis current in the second period.

5. The motor drive device according to claim 1, wherein the controller generates a control period in which the first period and the second period are repeated in a predetermined period.

6. The motor drive device according to claim 1, wherein when a voltage of a direct current (DC) power source supplied to each of the single-phase inverters is set to Ed, the controller performs a control operation such that all voltages applied to U-phase, V-phase, and W-phase windings in the first period correspond to +Ed or −Ed.

* * * * *